US011398059B2

(12) United States Patent
Zhao et al.

(10) Patent No.: US 11,398,059 B2
(45) Date of Patent: Jul. 26, 2022

(54) PROCESSING 3D VIDEO CONTENT

(71) Applicant: BEIJING DAJIA INTERNET INFORMATION TECHNOLOGY CO., LTD., Beijing (CN)

(72) Inventors: Yikai Zhao, Mountain View, CA (US); Yao Lu, Mountain View, CA (US); Ziyu Wen, Mountain View, CA (US); Yi Xu, Mountain View, CA (US); Xiubao Jiang, Mountain View, CA (US); Peiyao Zhao, Mountain View, CA (US); Kunyao Chen, Mountain View, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 365 days.

(21) Appl. No.: 16/630,427

(22) PCT Filed: May 7, 2018

(86) PCT No.: PCT/US2018/031458
§ 371 (c)(1),
(2) Date: Jan. 10, 2020

(87) PCT Pub. No.: WO2018/208698
PCT Pub. Date: Nov. 15, 2018

(65) Prior Publication Data
US 2020/0211230 A1 Jul. 2, 2020

Related U.S. Application Data

(60) Provisional application No. 62/549,606, filed on Aug. 24, 2017, provisional application No. 62/549,593, (Continued)

(51) Int. Cl.
*G06T 9/00* (2006.01)
*G03H 1/00* (2006.01)
(Continued)

(52) U.S. Cl.
CPC .......... *G06T 9/001* (2013.01); *G03H 1/0005* (2013.01); *G06T 15/04* (2013.01); *G06T 17/20* (2013.01)

(58) Field of Classification Search
CPC ......... G06T 9/001; G06T 15/04; G06T 17/20; G06T 15/00; G03H 1/0005; H04N 13/20
See application file for complete search history.

(56) References Cited

U.S. PATENT DOCUMENTS

| 6,525,722 | B1 | 2/2003 | Deering | |
| 6,678,710 | B1 * | 1/2004 | Shankar | ................ G06F 7/4833 |
| | | | | 708/517 |
| 10,008,031 | B1 * | 6/2018 | Pigeon | .................... G06F 30/20 |

(Continued)

OTHER PUBLICATIONS

International Search Report and Written Opinion issued in PCT/US2018/031458, dated Jul. 20, 2018, 5 pages.

*Primary Examiner* — Sultana M Zalalee
(74) *Attorney, Agent, or Firm* — Arch & Lake LLP

(57) ABSTRACT

A mobile device comprises: a mesh loader manages configured to download compressed mesh sequences from a remote server into a local storage buffer; a mesh decoder that is configured to decode compressed mesh sequences into frames of meshes in real-time; a mesh decoder manager that is configured to request compressed mesh sequences from the mesh loader and to request the mesh decoder to decode the compressed mesh sequences; a player manager that is configured to decode texture video and to request corresponding decoded mesh from the mesh decoder manager and to maintain synchronizations between requesting the corresponding decoded mesh and decoding the texture video; and a renderer that is configured to render, using a rendering engine, the decoded mesh on a canvas; and a camera controller that is configured to detect one or more (Continued)

user actions and control a hardware camera in accordance with the one or more user actions.

20 Claims, 25 Drawing Sheets

Related U.S. Application Data filed on Aug. 24, 2017, provisional application No. 62/549,632, filed on Aug. 24, 2017, provisional application No. 62/531,310, filed on Jul. 11, 2017, provisional application No. 62/531,284, filed on Jul. 11, 2017, provisional application No. 62/502,647, filed on May 6, 2017, provisional application No. 62/502,650, filed on May 6, 2017.

(51) Int. Cl.
*G06T 15/04* (2011.01)
*G06T 17/20* (2006.01)

(56) References Cited

U.S. PATENT DOCUMENTS

| | | | | |
|---|---|---|---|---|
| 2004/0218824 A1* | 11/2004 | Demaret | ............... | H04N 19/54 375/E7.11 |
| 2005/0062678 A1* | 3/2005 | Mark | ............... | G06T 15/10 345/2.1 |
| 2011/0157197 A1* | 6/2011 | Clemie | ............... | G06T 1/20 345/522 |
| 2012/0063678 A1* | 3/2012 | Asikainen | ............ | H04N 19/93 382/165 |
| 2012/0262444 A1 | 10/2012 | Stefanoski | | |
| 2012/0281059 A1* | 11/2012 | Chou | ............... | H04L 12/1827 348/E7.083 |
| 2014/0092439 A1 | 4/2014 | Krig | | |
| 2015/0228106 A1* | 8/2015 | Laksono | ............ | G06T 15/04 345/419 |
| 2017/0347122 A1* | 11/2017 | Chou | ............... | G06T 9/00 |
| 2018/0012407 A1* | 1/2018 | Chuang | ............... | G06T 15/04 |
| 2018/0096495 A1* | 4/2018 | Jiang | ............... | G06T 19/006 |
| 2018/0109792 A1* | 4/2018 | Song | ............... | H04N 19/51 |
| 2019/0253638 A1* | 8/2019 | Wen | ............... | H04N 5/23219 |

* cited by examiner

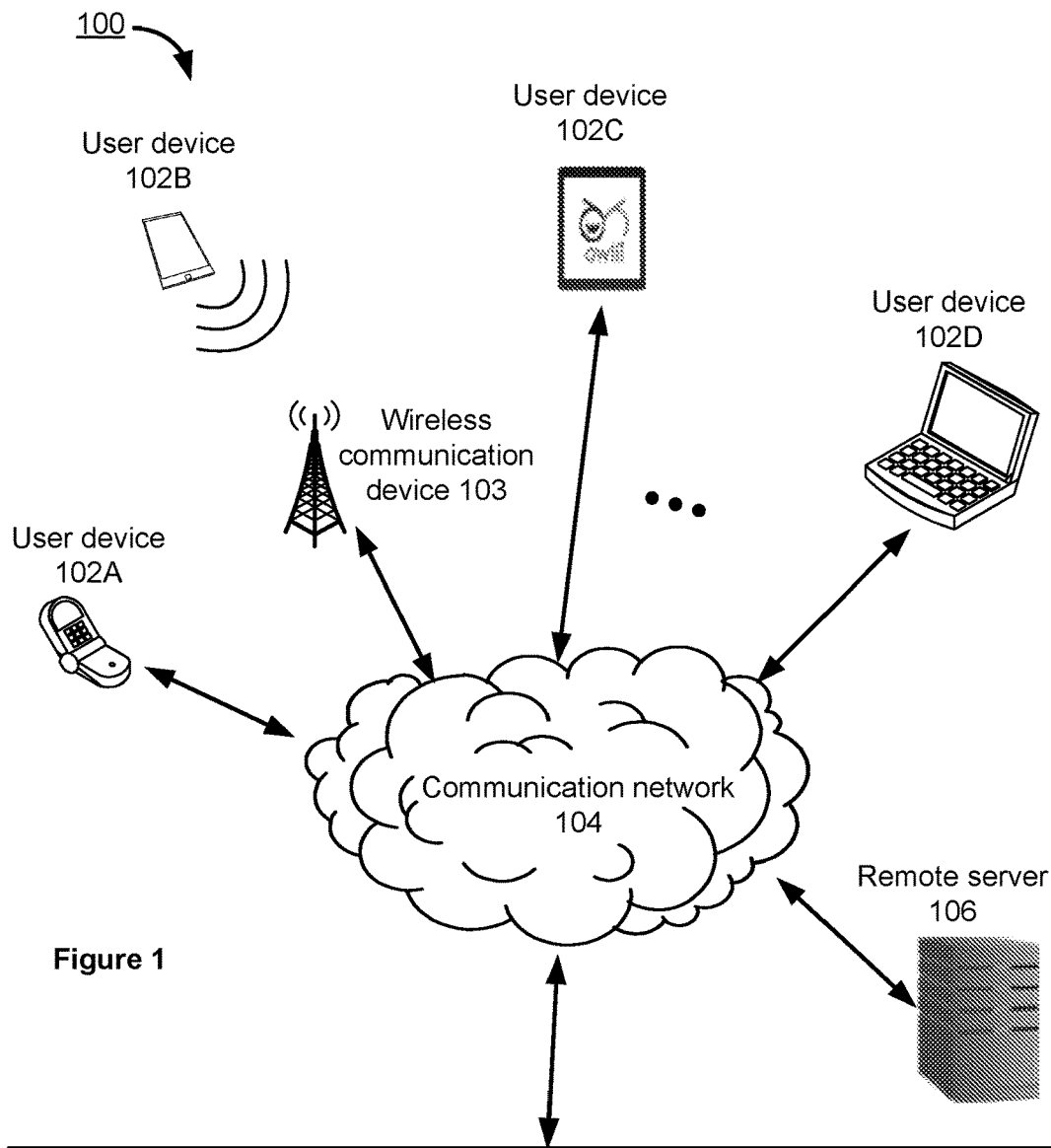
Figure 1
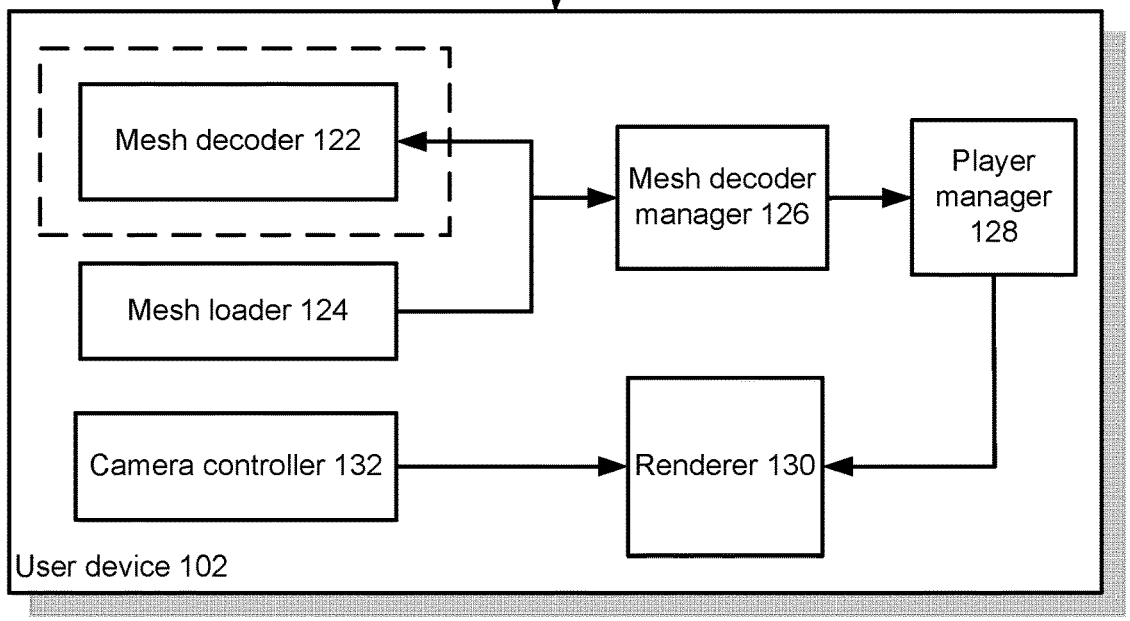

PROCESSING 3D VIDEO CONTENT

CROSS-REFERENCE TO RELATED APPLICATIONS

This application is a national phase application under 35 U.S.C. § 371 of International Patent Application No. PCT/US2018/031458, filed on May 7, 2018, which claims the benefit of the following U.S. Provisional Patent Applications:
Ser. No. 62/531,284, filed Jul. 11, 2017;
Ser. No. 62/531,310, filed Jul. 11, 2017;
Ser. No. 62/502,647, filed May 6, 2017;
Ser. No. 62/502,650, filed May 6, 2017;
Ser. No. 62/549,593, filed Aug. 24, 2017;
Ser. No. 62/549,606, filed Aug. 24, 2017; and
Ser. No. 62/549,632, filed Aug. 24, 2017.

All above-identified patent applications are hereby incorporated by reference in their entireties.

TECHNICAL FIELD

The present disclosure relates generally to computer graphics and more specifically to processing 3D video content.

BACKGROUND

Difficulties abound for processing and presenting high quality holographic videos. For example, a textured mesh hologram consists of a sequence of encoded meshes and a corresponding texture video. These holograms are usually rendered in native applications using low-level languages and APIs. Compressing, decompressing, transmitting and rendering holograms interactively in a web environment, especially on mobile devices, faces strong technical challenges.

The above identified technical problems are reduced or eliminated by the systems and methods disclosed herein.

SUMMARY

Systems and methods for processing holographic videos are disclosed in the present disclosure. An example web-based interactive 3D textured mesh hologram rendering mobile device comprises: a mesh loader manages configured to download compressed mesh sequences from a remote server into a local storage buffer; a mesh decoder that is configured to decode compressed mesh sequences into frames of meshes in real-time; a mesh decoder manager that is configured to request compressed mesh sequences from the mesh loader and to request the mesh decoder to decode the compressed mesh sequences; a player manager that is configured to decode texture video and to request corresponding decoded mesh from the mesh decoder manager and to maintain synchronizations between requesting the corresponding decoded mesh and decoding the texture video; and a renderer that is configured to render, using a rendering engine, the decoded mesh on a canvas; and a camera controller that is configured to detect one or more user actions and control a hardware camera in accordance with the one or more user actions.

In some implementations, the rendering engine is a WebGL, rendering engine.

In some implementations, the canvas is a HTML5 canvas.

In some implementations, the mesh decoder is transcoded from a programming language not supported by the mobile device.

In some implementations, the mesh loader and the mesh decoder manager are executed synchronously.

In some implementations, the camera controller uses the hardware camera to capture the one or more user actions and provides the one or more user actions as feedback to the renderer.

In some implementations, the mesh decoder manager is configured to request the mesh decoder to decode the compressed mesh sequences on an as-needed basis.

In some implementations, the mesh decoder manager is configured to request the mesh decoder to decode a pre-defined amount of compressed mesh sequences more than those requested by the player manager.

In some implementations, the mesh decoder manager is configured to remove previously-decoded mesh from a mesh buffer connected to the player manager.

In some implementations, the mesh loader is configured to download compressed mesh sequences from the remote server, even absent a request by the mesh decoder manager to download the compressed mesh sequences.

BRIEF DESCRIPTION OF THE DRAWINGS

FIG. 1 is a block diagram illustrating an example hologram processing system in accordance with some implementations.

DETAILED DESCRIPTION

Figure 2:
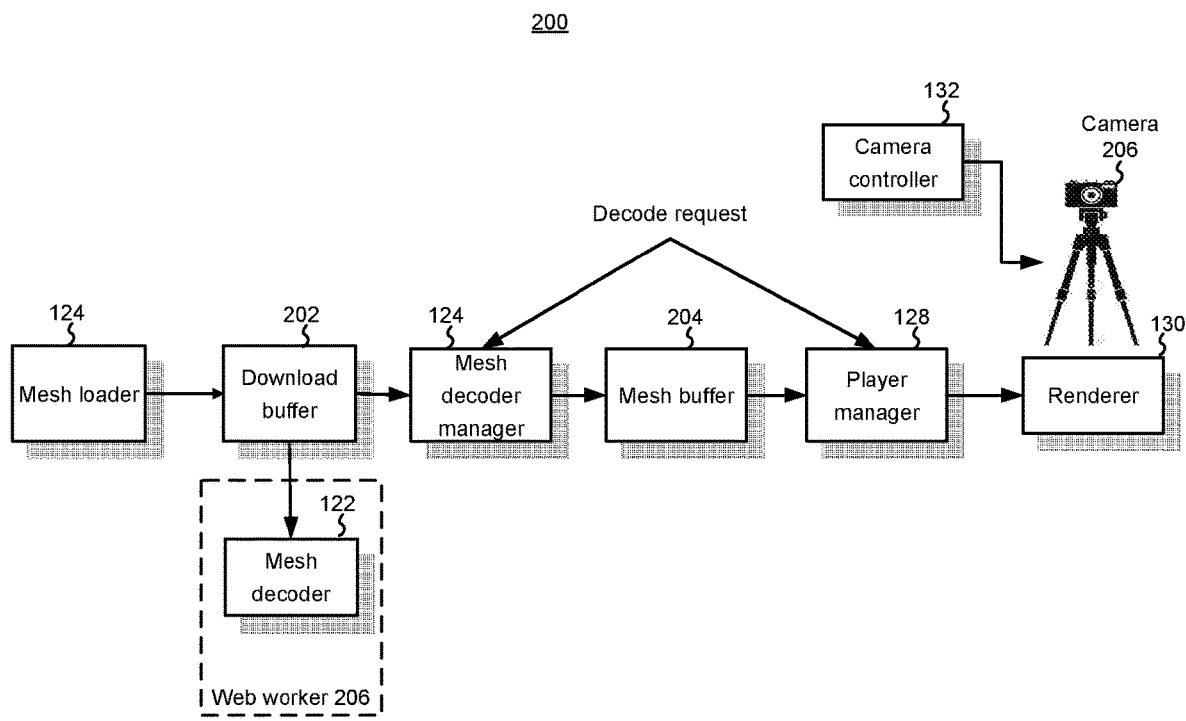
FIG. 2 is a flowchart illustrating an example method for processing hologram in accordance with some implementations.

Web-Based Interactive 3D Textured Mesh Hologram Rendering

FIG. 1 is a block diagram illustrating an example hologram processing system 100 in accordance with some implementations.

In some implementations, the computing system 100 includes one or more user devices 102 (e.g., mobile device 102A, 102B, 102C, 102D . . . , and 102N), a communication network 104, and a remote server 106.

In some implementations, a user device 102 renders holograms based on data received from the remote server 160. A user device 102 may be a mobile device, e.g., a smart phone, a laptop computer, a tablet computer, or an audio/video player. In some implementations, the user device 102 includes a mesh decoder 122, a mesh loader 124, a mesh decoder manager 126, a player manager 128, a renderer 130; and a camera controller 132.

In some implementations, the communication network 104 interconnects one or more devices 102 with each other, and with the clustering system 106. In some implementations, the communication network 104 optionally includes the Internet, one or more local area networks (LANs), one or more wide area networks (WANs), other types of networks, or a combination of such networks.

In some implementations, the remote server system 106 stores hologram data, which may be transmitted to a user device 120 for processing and presentation. The remote server system 106 may process the hologram data by compressing and decompressing the data, as well as analyzing and modifying the data for reconstruction.

FIG. 2 is a flowchart illustrating an example method 200 for processing hologram in accordance with some implementations.

The method 200 can effectively render 3D textured mesh holograms in a web environment in accordance with user interactions. A system executing the method 200 may also referred as a player in the present disclosure. The system can be configured to operate on both desktop devices and mobile devices.

An example Player may be implemented in JavaScript programs and runs on various types of browsers. It loads encoded meshes and corresponding texture video asynchronously, decodes meshes frame by frame into vertices, triangle indices and texture coordinates, decodes texture video using hardware decoder if possible and renders the decoded mesh and texture while maintaining synchronization. Furthermore, the Player can respond to user actions such as mouse dragging, finger pinch etc., to move, zoom or rotate the hologram.

In some implementations, the method 200 includes a mesh decoding process using the mesh decoder 122. A mesh decoder may be used to decode compressed mesh sequences into frames of meshes. The mesh decoder may perform computations only and thus does not interact with any UI components. The mesh decoder may therefore be easily transcoded from other languages (e.g. from C/C++ using emscripten). The Mesh Decoder may run on a separated. Web Worker so that it does not block CPU on a main thread.

In some implementations, the method 200 includes a mesh downloading process 124 using the mesh loader 124. A mesh loader manages downloads of compressed mesh sequences from the remote server 160 and stores the downloaded mesh sequences in a storage buffer, where the mesh sequence await decompression and rendering. The mesh loading process may load multiple mesh sequences concurrently, asynchronously, and with or without different priorities.

In some implementations, the method 200 further includes, using the mesh decoder manager 124, to requests compressed mesh bytes from the mesh loader 124, and to decode the compressed mesh bytes using the mesh decoder 122, e.g., either on demand and asynchronously.

The mesh decoder manager 124 may retrieve decoded mesh data, from a mesh buffer 204, and provide the decoded mesh data to the player manager 128.

The player manager 128 may decode texture video and request corresponding decoded mesh from the mesh decoder manager 128, both of which may be sent to the renderer 130. The player manager 128 may maintain synchronizations between the mesh and the texture.

The renderer 130 takes decoded mesh (which may include vertices, triangle indices, and texture coordinates) and video frame from the player manager 128 and uses, for example, the WebGL rendering engage, to render the decoded mesh on a HTML5 canvas. The renderer 130 exposes a camera object to allow external control of the rendering result.

The camera controller may also be used to detect user actions, e.g., a mouse dragging, a mouse scrolling, a finger movement, a finger pinching (on a desktop computer or a mobile device), and sets parameters of camera object from the renderer, enabling user interaction with a rendered hologram.

Asynchronous mesh downloading and decoding may also be provided. Compressed mesh sequences are small binary files hosted at the remote server 106, one file per frame. Decoded meshes are stored in JavaScript ArrayBuffers (vertices, triangle indices and texture coordinates) and may be relatively large (~1 MB) per frame).

As shown in FIG. 2, the mesh loader may download compressed mesh data from a remote server and store the compressed mesh in the download buffer 202 as binary bytes; the mesh decoder manager takes binary bytes from the download buffer, decodes the binary bytes into decoded meshed, and storage the decoded mesh in the mesh buffer 204.

Due to memory constraints, downloaded compressed mesh sequences may be kept in buffer for an extended period of time after having been downloaded, while the decoded meshes may be too large to be kept for an extended period of time. Therefore, in some implementations, the mesh loader may start downloading compressed mesh sequences as soon as the Player is becomes ready; in contrast, the mesh decoder manager may decode meshes on demand or only when a predefined condition is met.

For example, the mesh decoder manager may receive one or more decoding requests from the player manager; the request may include data defining which frame of mesh may be used in the near future. After receiving a decoding request, the mesh decoder manager may begin decoding and decode a few frames more (e.g. 5 more frames) than originally requested and removes previously-decoded frames from the mesh buffer.

Note that as the mesh decoder decodes mesh frames in order; as a result, if a frame requested has a number (e.g., 4) lower than the total number of frames (e.g., 9) decoded in the last request, the mesh decoder manager may have to restart decoding from the beginning, which may occur when a content is being replayed from the beginning. If the required data for decoding is not yet ready from the mesh buffer, the mesh decoder manager may pause processing and retry after a predefined time period (e.g. 30 ms).

The mesh decoder manager decodes by using the mesh decoder on a separate (e.g., in another host thread). The mesh decoder manager forwards decoding requests to the mesh decoder and receives and stores the decoded mesh in the mesh buffer, via an Message Passing interface. The mesh loader and the mesh decoder manager may work asynchronously to avoid blocking the main event loop for an extended period of time.

Synchronization between Mesh and Texture: the player manager loads texture video using HTML5 video element and starts video playing on a user request. The video element provided by a browser uses a native decoder (a hardware decoder if available) to decode video, in order to provider higher performance. The video element is not added to DOM and is set to "playsinline" in mobile browsers, so it would be hidden from user.

The HTML5 video element may not provide APIs to precisely determine the current frame number, to perfectly synchronize meshes and texture video. "Frame Number Bit Pattern" may be added to texture video. For each texture frame, its frame number is converted to 16 bit binary number, then converted to a 64×4 black/white bitmap, with 4×4 pixels each bit. The result bitmap is then overlaid on left-top corner of each texture frame. Since the texture image is usually at resolution of 1024×1024 or larger with black paddings, the small overlaid pattern have almost zero impact on the texture. Note that, a 4×4 pixels area for each bit is used to avoid data losses after video encoding.

The player manager may register a callback before each browser repaint using window.requestAnimationFrame API. On each callback call, it reads current video frame number by drawing video element's 64×4 patterns into canvas and parsing, send new decoding request to mesh decoder manager, and if the corresponding mesh is available at mesh buffer, call the renderer to render the mesh and video. If, on the other hand, the corresponding mesh is not available at mesh buffer yet, the player manager would temporary pause the video (by setting video's currentTime) and wait for the next call.

Rendering using WebGL the renderer may render decoded mesh and texture video using WebGL, APIs, Two different implementations are available.

In the first implementation, the renderer passes the HTML5 video element directly to a WebGL engine as texture. The texture does not need to be copied twice, to improve system performance. Some browsers, however, do not supports this feature, in which case the renderer resorts to the second implementation discussed below. Also, as the texture is uploaded to a GPU after the frame number detection described in the previous section without any synchronization, the mesh and texture may become out of sync.

In the second implementation, the renderer draws the video content into an HTML5 canvas element and then passes the canvas element to the WebGL engine as texture. This implementation offers good compatibility but slightly lower performance. Because the drawing to canvas process was already completed while when the frame number is detected. The mesh and texture do not become out of sync in this second implementation.

Figure 3:
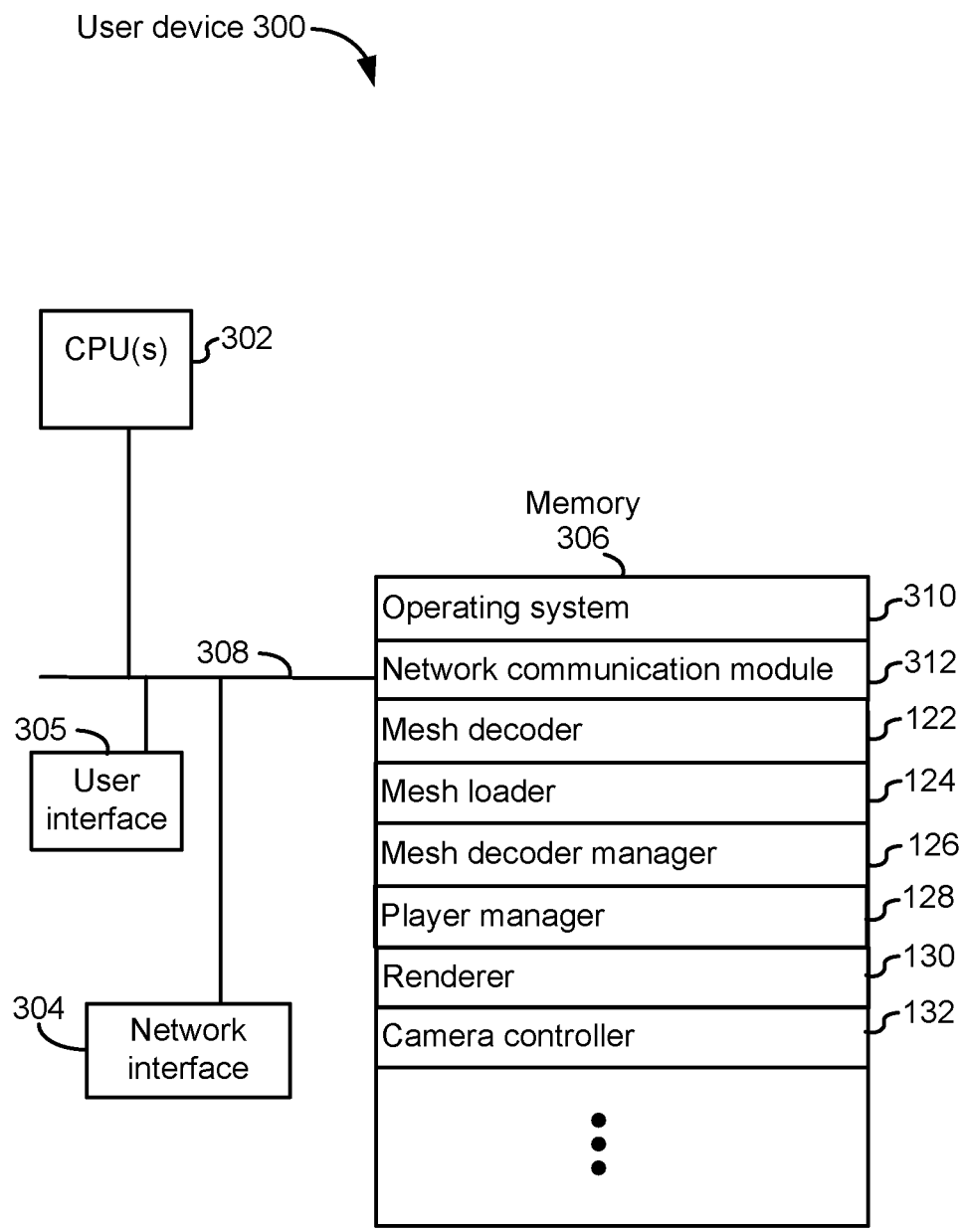
FIG. 3 is a block diagram illustrating a user device for rendering holograms in accordance with some implementations.

FIG. 3 is a block diagram illustrating a user device 300 (which may be any of the user devices 102A ... 102D shown in FIG. 1) for rendering holograms in accordance with some implementations. The user device 300 in some implementations includes one or more processing units CPU(s) 302 (also referred to as processors), one or more network interfaces 304, a user interface 305, a memory 306, and one or more communication buses 308 for interconnecting these components. The communication buses 308 optionally include circuitry (sometimes called a chipset) that interconnects and controls communications between system components. The memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from the CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the user device 102 with other devices (e.g., the remote server 106 and the user devices 102A ... 102D) via one or more network interfaces 304 (wired or wireless) or the communication network 104 (FIG. 1);
- a mesh decoder
- a mesh loader 124;
- a mesh decoder manager 126;
- a player manager 128;
- a renderer 130; and
- a camera controller 132.

In some implementations, the user interface 205 includes an input device (e.g., a keyboard, a mouse, a touchpad, a track pad, and a touch screen) for a user to interact with the device 300.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Figure 4:
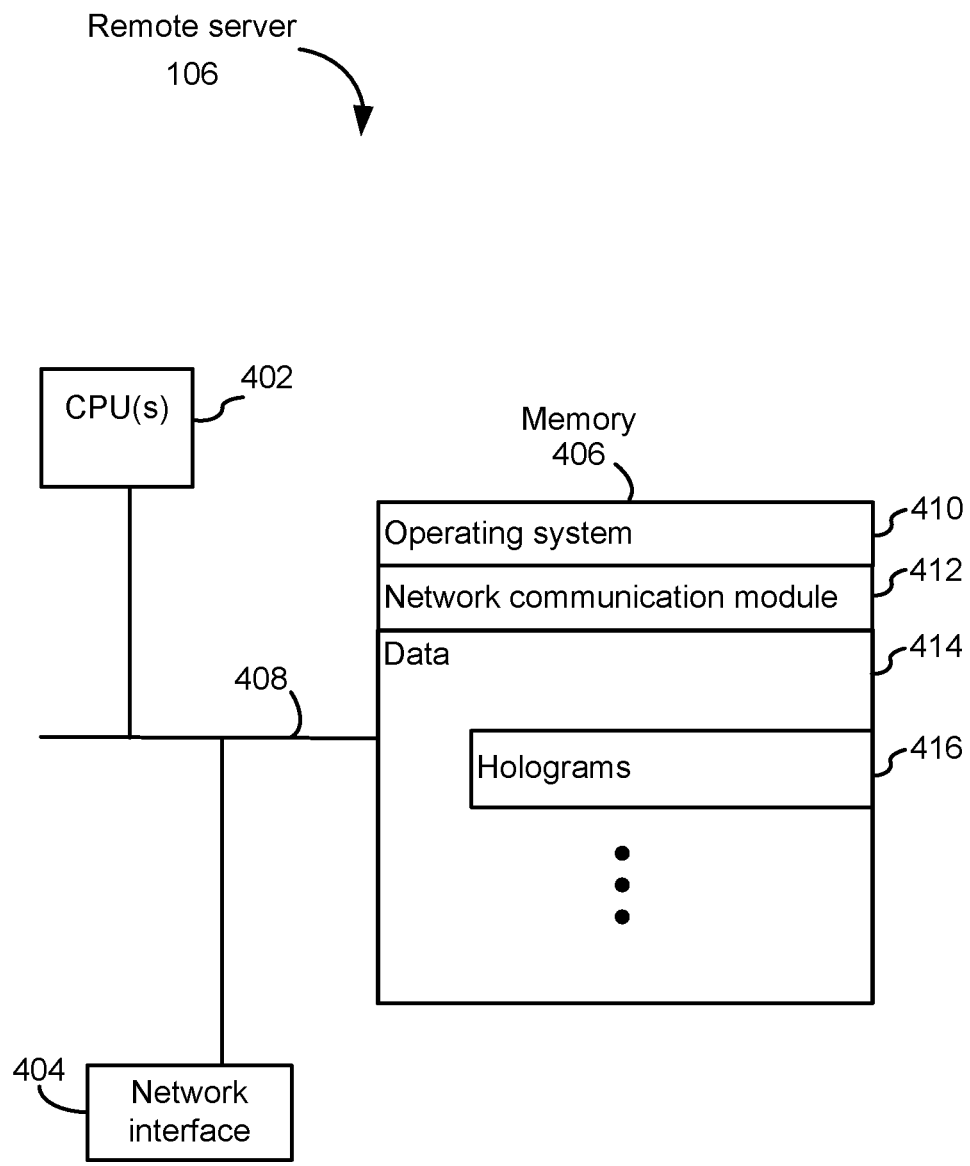
FIG. 4 is a block diagram illustrating a remote server for rendering holograms in accordance with some implementations.

FIG. 4 is a block diagram illustrating a remote server 400 (which may be the remote server 106 shown in FIG. 1) for rendering holograms in accordance with some implementations. The remote server 400 in some implementations includes one or more processing units CPU(s) 402 (also referred to as processors), one or more network interfaces 404, a memory 406, and one or more communication buses 408 for interconnecting these components. The communication buses 408 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

- an operating system 410, which includes procedures for handling various basic system services and for performing hardware dependent tasks;
- a network communication module (or instructions) 412 for connecting the remote server 400 with other devices (e.g., any of the user devices 102A . . . 102D) via one or more network interfaces 404 (wired or wireless) or the communication network 104 (FIG. 1); and
- data 414 which may include one or more holograms 416 or portions thereof.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
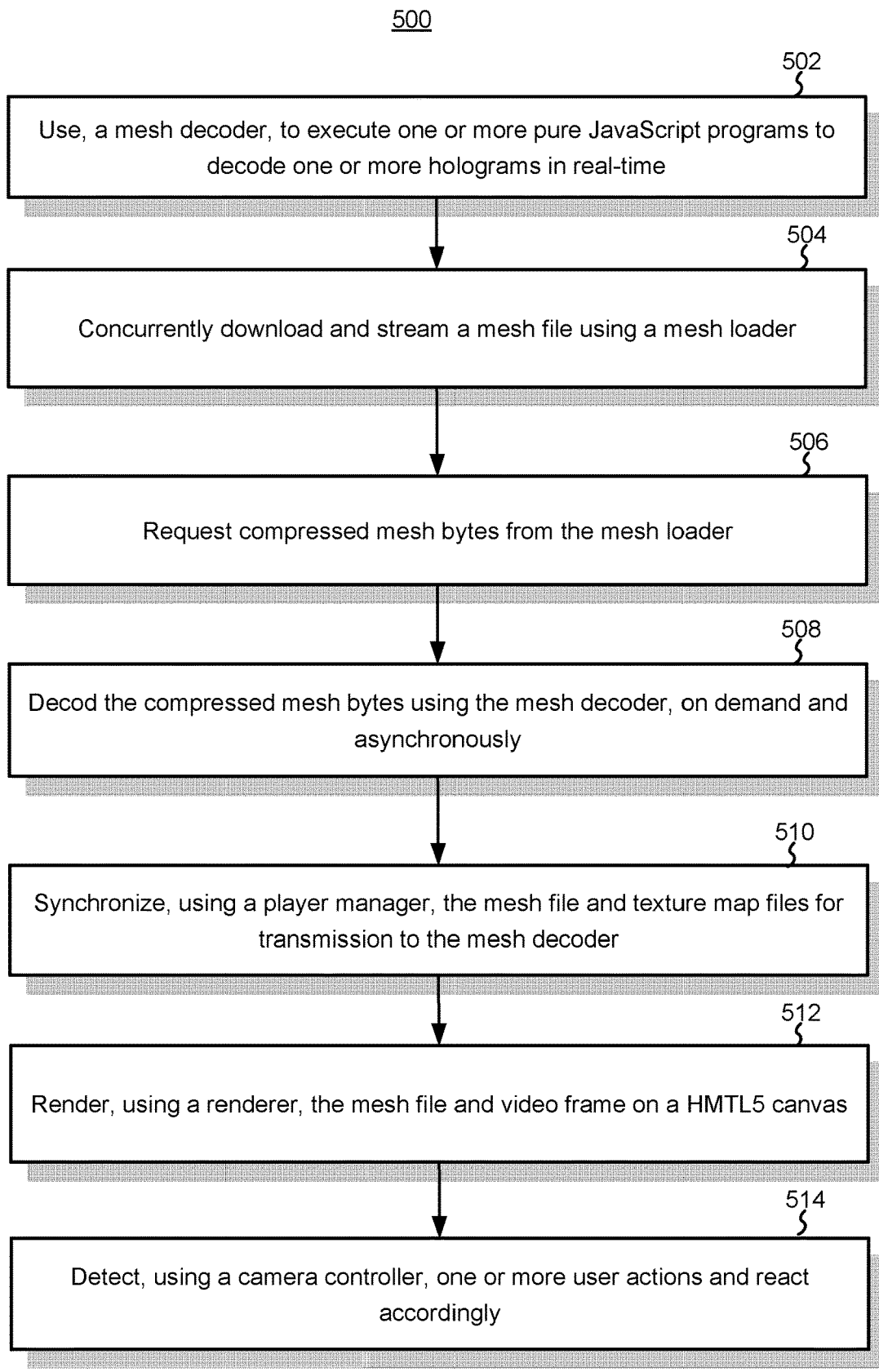
FIG. 5 is a flow chart illustrating a method for interactive 3D textured mesh hologram rendering in a web environment in accordance with some implementations.

FIG. 5 is a flow chart illustrating a method 500 for interactive 3D textured mesh hologram rendering in a web environment in accordance with some implementations. The method 500 may be implemented at a user device, such as a mobile device or a desktop computer.

In some implementations, the method 500 includes using, a mesh decoder, to execute one or more pure JavaScript programs to decode (502) one or more holograms in real-time; concurrently downloading and streaming (504) a mesh file using a mesh loader; and requesting (506) compressed mesh bytes from the mesh loader.

The method may further include decoding (508) the compressed mesh bytes using the mesh decoder, on demand and asynchronously; synchronizing (510), using a player manager, the mesh file and texture map files for transmission to the mesh decoder; rendering (512), using a renderer, the mesh file and video frame on a HMTL5 canvas; and detecting (514), using a camera controller, one or more user actions and react accordingly.

Compressing 3D Holograms

The present disclosure also provides technologies for compressing one or more holograms.

Figure 6:
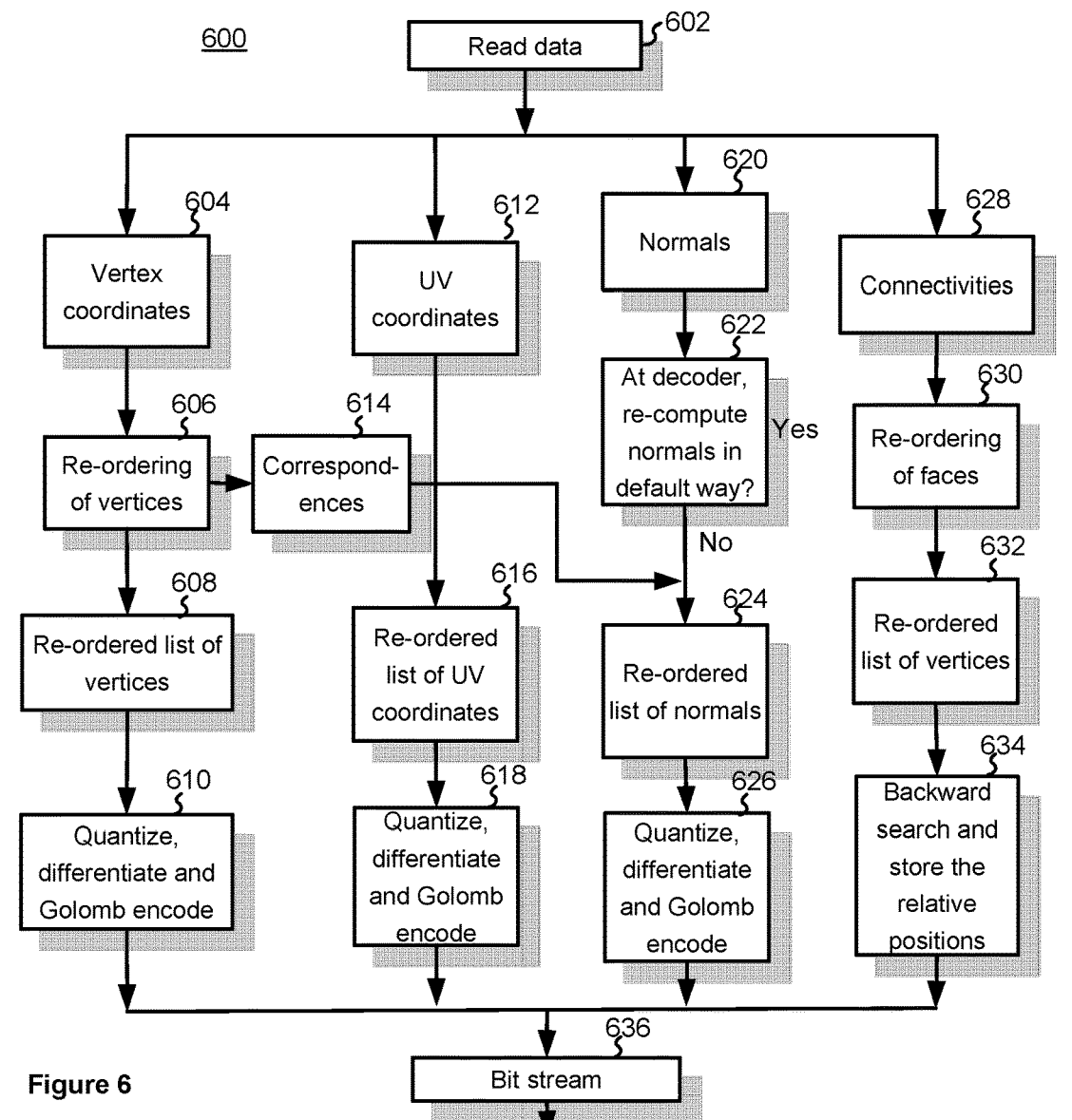
FIG. 6 is a flowchart illustrating an example workflow of an I frame codec in accordance with some implementations.
Figure 6:
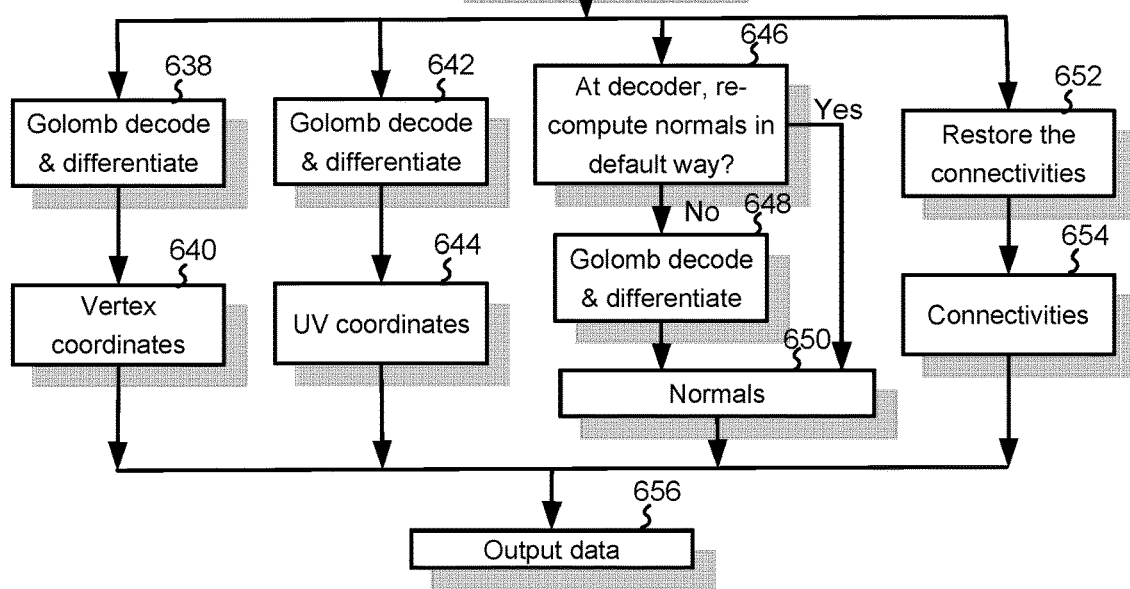

Frame Codec: FIG. 6 is a flowchart illustrating an example workflow 600 of an I frame codec in accordance with some implementations. The I frame codec may include an encoder and a decoder as described below.

I Frame Codec—Encoder

1. Vertex Coordinates (1) Reordering

In order to take advantage of the "continuity" (for the 3D mesh model of any object, connected vertices are close to each other in the 3D space) of the coordinates, the encoder first reorders the vertices so that every vertex in the list is very close in the 3D space to its previous one. This step may increase coding efficiency.

There is a list of vertices for the model in the file. Basically, starting from any vertex in the list (usually just pick the first one), the encoder does depth-first search based on their connectivities, and push the vertices to the new list in the order they are found.

To this end, the encoder maintains a FILO (first-in-last-out) stack initialized to be empty. The encoder first picks any vertex, marks it as found, and pushes it into the stack. Then every time the encoder pulls a vertex out of the stack, it finds all of its connected neighbors that are not marked, mark them as found, push them into the stack in an order from the farthest to the nearest, and puts this vertex to the back of the new list. Once the stack becomes empty (it means that all the vertices of one connected component have been found and marked, the encoder should turn to next one), the encoder picks any vertex that is not marked as the new starting point.

The encoder repeats this step until all the vertices are marked. The correspondences between new rank and old rank of the vertices are maintained since the same re-ordering is needed for UV coordinates, normals, and connectivities, and also for those in the P frames. After the reordering is completed, the quantizing process may begin.

(2) Quantizing

The input coordinate data are expressed as 32-bit floats, typically at a range from minus several thousand millimeters to several thousand millimeters. Therefore, much less bits are actually needed to represent high resolution models, and so quantization is used to achieve high compression rate. Since the data has explicit physical meaning (3D coordinates), the encoder quantizes them to have an explicit control over the degree of precision needed, and then perform lossless coding.

The user inputs precision parameter (i.e. the maximum error allowed) for the compression. The encoder first divide all the coordinates by 2*precision and then cut off the decimal part. The retained integer part is ready for lossless coding.

(3) Differential Operation and Gotomb Coding

Thanks to the reordering step, now each vertex in the new list is very close to its previous neighbor. Hence, the encoder does not store each coordinate, but its difference from the previous one, which has a much narrower dynamic range.

It can be found that the differences obtained from the previous step approximately follow the double-sided exponential distribution. So for each side of the distribution, the encoder does Golomb coding, excluding those deviating too much from the center, for Which the encoder uses fixed number of bits are used to represent.

2. UV Coordinates

Note that the UV coordinates have been reordered corresponding to the reordering of the vertex coordinates. Then the coding of UV coordinates follows the same manner of vertex coordinates—quantizing, differentiating, and Gotomb coding, because for two adjacent points in the 3D space, their UV coordinates are typically close to each other.

3. Connectivities

Each connectivity is comprised of 3 or more numbers, each being the ID of a vertex. Note that the vertices have been reordered, so each connectivity should be assigned new vertex IDs correspondingly. Now the encoder reorders the connectivities in exactly the same way as for vertices. After reordering, the vertex IDs occurring in a connectivity have probably occurred in the previous connectivity (or one of the several previous connectivities). This means that there is no need to store a vertex ID, but the nearest relative position this ID occurs previously, if it does, otherwise the ID itself is stored (can also store the difference from some of the previous IDs). This scheme dramatically reduces the number of bits that are needed to store the information.

4. Normals

The normals of vertices are special information for a 3D model, in that they can often be computed with vertex coordinates and connectivities in a typical way—the normal of a vertex is the average of the faces that have this vertex, weighted by the area of the faces. So if they are indeed obtained in this way, there is no need for the encoder to store anything about them; otherwise, they can be compressed by the same manner as vertex coordinates.

In some implementations, the compressed data produced by the above encoding process can be injected into a zip encoder, which brings an approximately 10% compression further gain.

I Frame Codec—Decoder

The decoder may carry out the inverse process of the encoding process described above. For example, the decoder may perform Golomb decoding, de-differentiating, etc. Moreover, the list of vertices, etc., does not need to be recovered to the original rank, since it does not actually affect the model.

Figure 7:
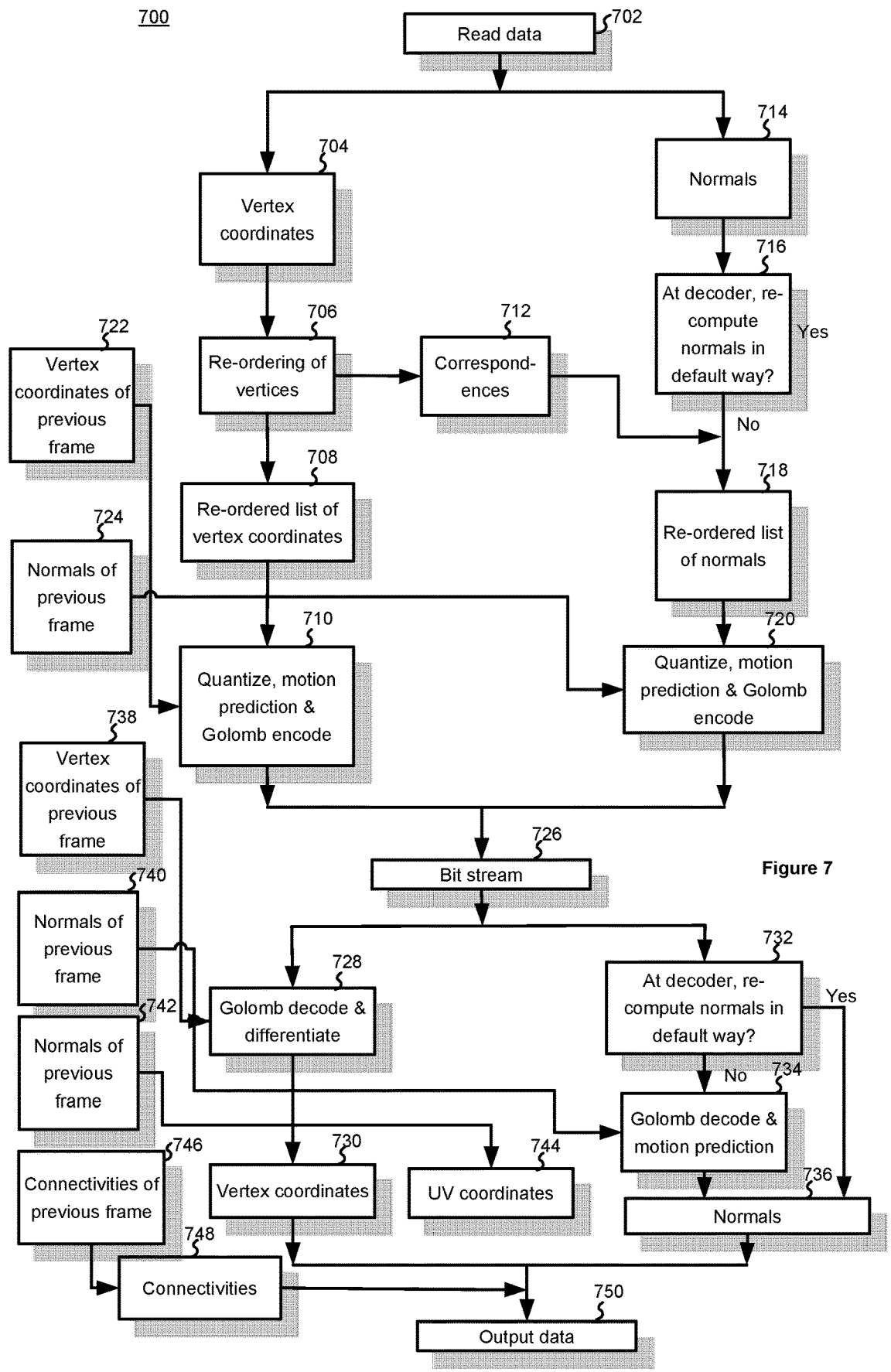
FIG. 7 is a flowchart illustrating an example workflow of a P frame codec in accordance with some implementations.

P Frame Codec: FIG. 7 is a flowchart illustrating an example workflow 700 of a P frame codec in accordance with some implementations.

P Frame Codec—Encoder

The UV coordinates and connectivities of P frames are exactly the same as the I frame, so only vertex coordinates and normals might need to be stored.

1. Vertex Coordinates

In the beginning, the encoder reorders the vertices according to the I frame. The corresponding vertices in adjacent frames are typically very close to each other, as long as the frame rate is equal to or above the typical rate (25 fps) and the object is moving not too fast (not much faster than human motions). Therefore, the encoder predicts the vertex coordinates by the corresponding vertices in the previous frames, which may be called motion prediction.

A first-order motion predictor simply predicts the coordinates of the vertices by those of the corresponding vertices (after being quantized) in the previous one frame. Then encoder then takes the differences of the true coordinates (after being quantized) from their predicted values, and store those differences using Golomb coding in the same manner as for the I frame.

2. Normals

Similarly, if the normals can be computed in the typical manner at the decoder, then there is no need to store any information. Otherwise, the normals are encoded in a similar way with vertex coordinates (Golomb coding of the differences from its previous frame).

In some implementations, the compressed data produced by the above encoding process can be injected into a zip encoder, which brings an approximately 10% compression further gain.

P Frame Codec—Decoder

The decoder may carry out the inverse process of the encoding process described above. For example, the decoder may perform Golomb decoding, de-differentiating, etc. Moreover, the list of vertices, etc. is not required to be recovered, to the original rank, since it does not actually affect the model.

Figure 8:
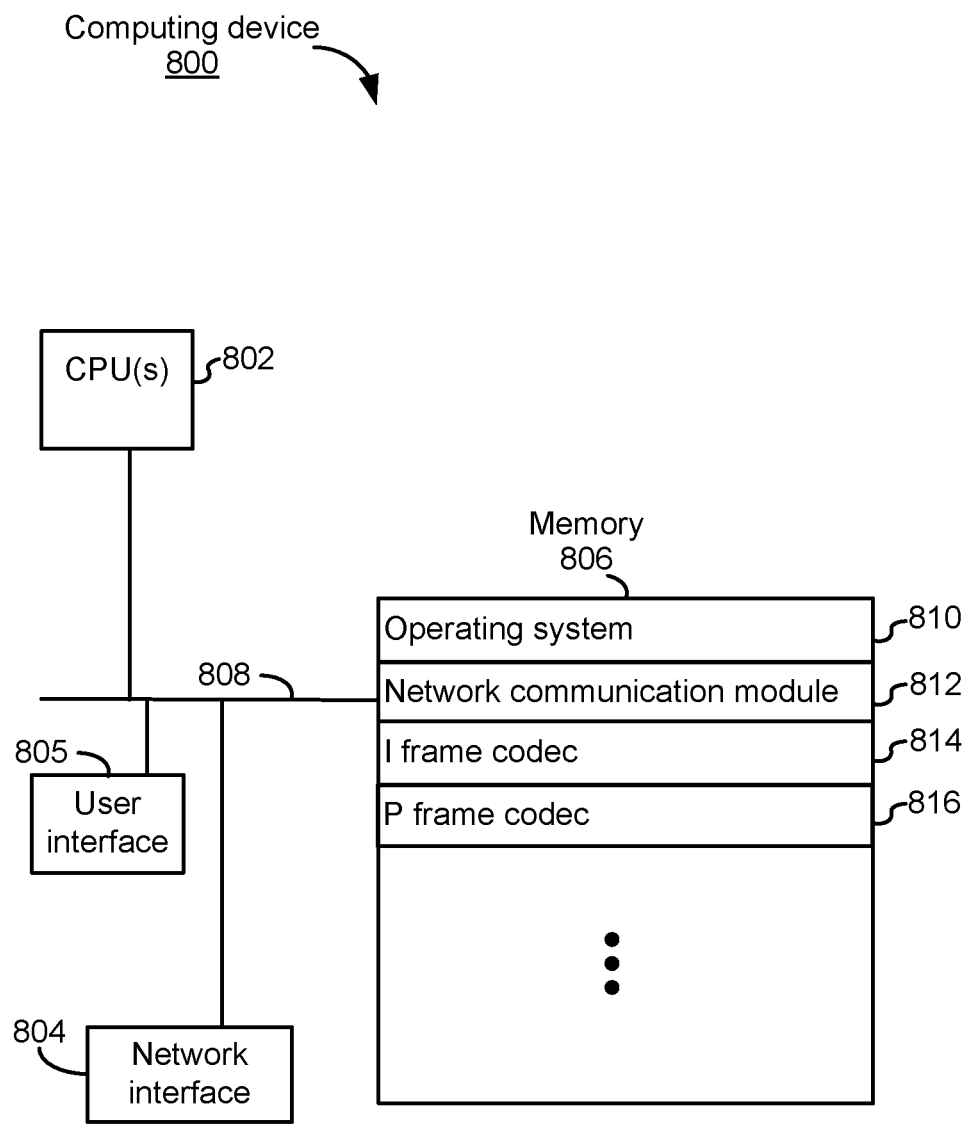
FIG. 8 is a block diagram illustrating an example computing device for compressing and de-compressing holograms in accordance with some implementations.

FIG. 8 is a block diagram illustrating an example computing device (which may be the remote server 106 shown in FIG. 1) for compressing and de-compressing holograms in accordance with some implementations. The remote server 800 in some implementations includes one or more processing units CPU(s) 802 (also referred to as processors), one or more network interfaces 804, a memory 806, and one or more communication buses 808 for interconnecting these components. The communication buses 808 optionally include circuitry (sometimes called a chipset) that interconnects and controls communications between system components. The memory 806 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806, or alternatively the non-volatile memory device(s) within the memory 806, comprises a non-transitory computer readable storage medium. In some implementations, the memory 806 or alternatively the non-transitory computer readable storage medium stores the following programs, modules and data structures, or a subset thereof:
- an operating system 810, which includes procedures for handling various basic system services and for performing hardware dependent tasks;

a network communication module (or instructions) 812 for connecting the remote server 400 with other devices (e.g., any of the user devices 102A ... 102D) via one or more network interfaces 404 (wired or wireless) or the communication network 104 (FIG. 1);

an I frame codec 814, which may include:
an encoder 822 and a decoder 824; and an P frame codec 816, which may include:
an encoder 832 and a decoder 834.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 806 optionally stores a subset of the modules and data structures identified above. Furthermore, the memory 806 may store additional modules and data structures not described above.

Figure 9:
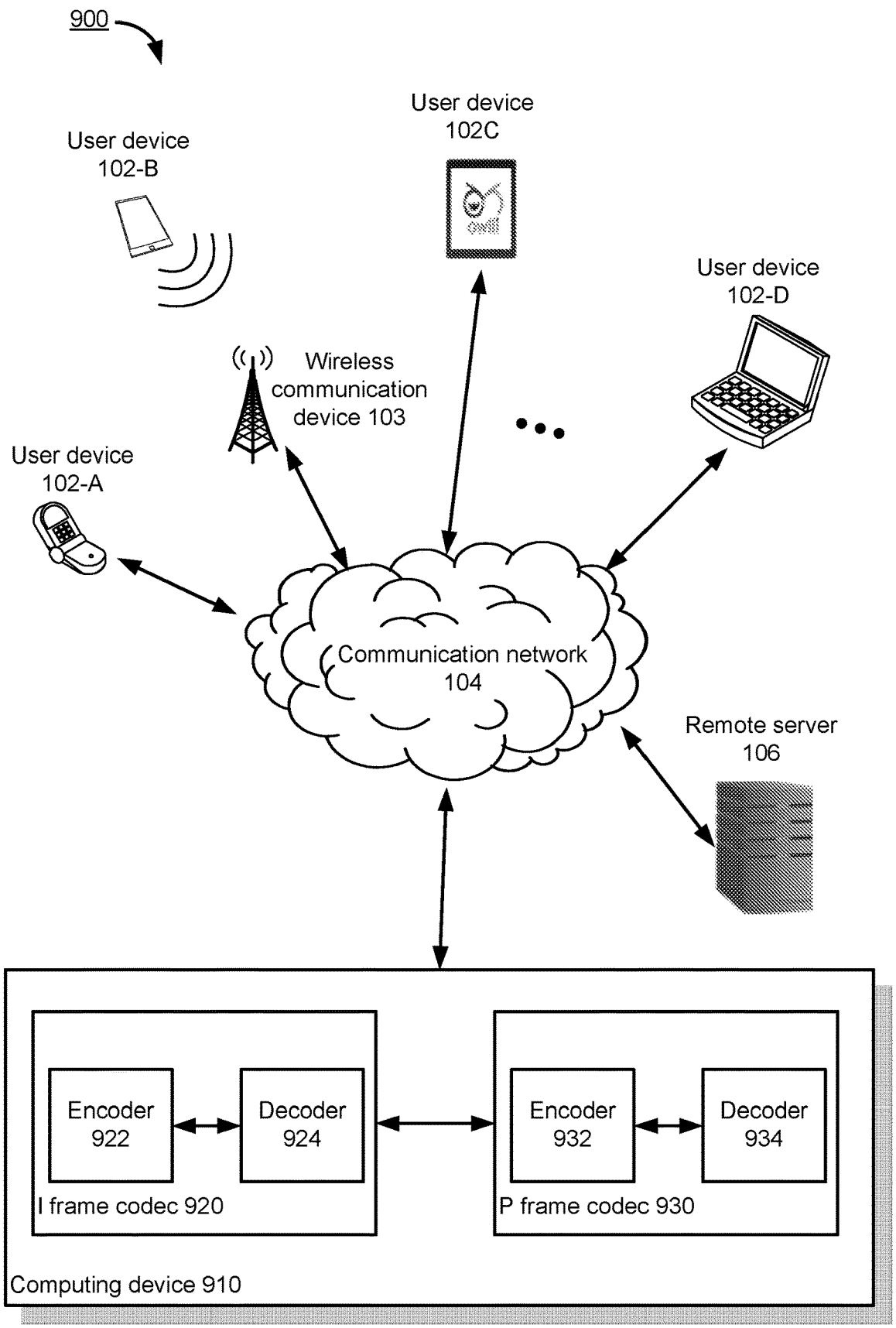
FIG. 9 is a block diagram illustrating an example system for compressing and de-compressing holograms in accordance with some implementations.

FIG. 9 is a block diagram illustrating an example system 900 for compressing and de-compressing holograms in accordance with some implementations.

In some implementations, the computing device 910 includes a segmentation module 122, a human body detection module 124, a tracking module 126, a texturing module 128, and a packaging module 130. Detail functionalities provided by each of these modules are explained below with references to relevant figures.

Mesh Tracking for Dynamic 3D Reconstruction

Dynamic 3D reconstruction may produce a sequence of 3D meshes, each of which is reconstructed from the observed per frame data. Different 3D meshes therefore may have independent connectivity, which makes it difficult to compress the mesh sequence and may also result in flicking when the sequence is played back.

A mesh tracking-based dynamic 3D reconstruction process is provided in the present disclosure. This process may take a sequence of per-frame reconstructed 3D meshes as input and outputs a sequence of tracked meshes. The tracked mesh sequence may include multiple groups (which are also called sub-sequences); meshes included the same group share the same connectivity.

Figure 10:
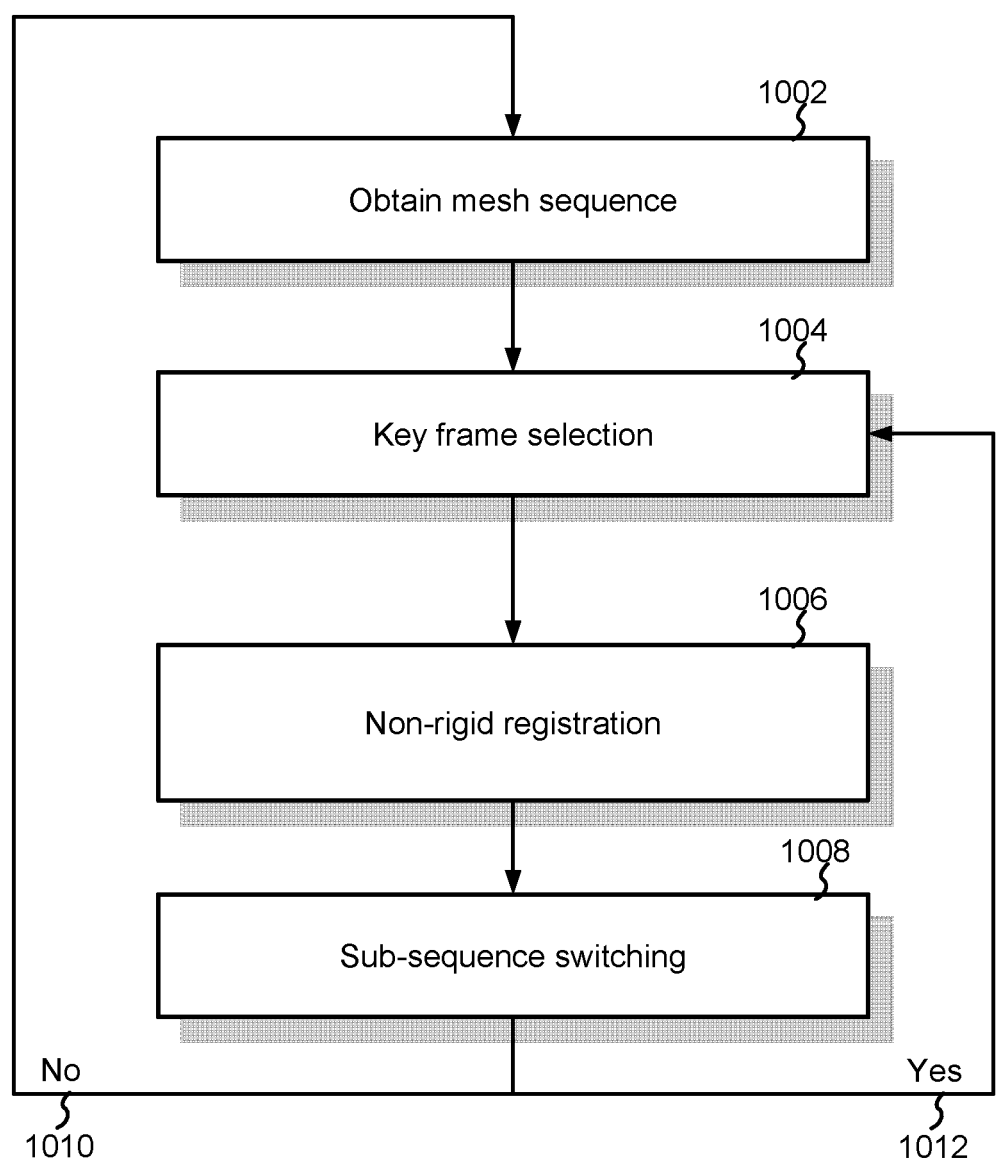
FIG. 10 is a block diagram illustrating a method for dynamic 3D reconstruction and tracking in accordance with some implementations.

FIG. 10 is a block diagram illustrating a method 1000 for dynamic 3D reconstruction and tracking in accordance with some implementations.

In some implementations, the method 100 includes a key frame selection process (1004). The key frame selection process calculates a score for each input mesh (1002) and, in some cases, selects the one with highest score as the key frame from the untracked meshes. Three factors may be considered in calculating the score: the mesh connected component number, the mesh genus, and the mesh area. The score may be calculated as follows:

$$\text{score} = f(cc, \text{genus}, \text{area})$$

where $f(\cdot,\cdot,\cdot)$ is a function of connected component number, genus and area. Function $f(\cdot,\cdot,\cdot)$ is monotone decreasing of mesh connected component number, monotone decreasing of mesh genus and monotone increasing of mesh area, which means that the mesh with small connected component number, small genus and large area has the largest score.

In some implementations, the method 1000 also includes a non-rigid registration process (1006). The non-rigid registration module deforms the key frame mesh to match the nearby input meshes. The deformed mesh may be called the tracked mesh. The non-rigid registration operation is performed from the key frame to the nearby frames with both the increasing and decreasing orders, until the group switching conditions are satisfied or all of the nearby frames are tracked. Non-rigid registration is realized by solving an optimization problem using Iterative Closest Point (ICP) method.

In some implementations, the method 1000 further includes a sub-sequence switching process (1008). The tracked mesh may have large alignment error compared to the input mesh or the quality of tracked mesh degrades severely, either of which may trigger the group switching process. Notice that the non-rigid registration is performed in both increasing and decreasing order; while the group switching operation stops the non-rigid registration process in its present order. If both the increasing and decreasing order stop, the method 1000 returns to the key frame selection step 1004. The above mentioned procedures may be repeated until all of the input meshes are tracked.

The detailed operations of these three modules are listed as followings.

The key frame selection process: assuming that the frame indexes of the input meshes are 1, 2, ..., N and the calculated score of each frame is denoted as $s_1, s_2, \ldots, s_n$. Each frame has a status indicator indicating whether this frame has been tracked. At the initialization step, all frames stay at the untracked status. Denote the index set of untracked frames as T. Then the key frame selection operation can be expressed as $$k = \operatorname*{argmax}_n s_n, \; s.t. n \in T$$

which means selecting, from the untracked frames, the frame with the largest score as the key frame.

The non-rigid registration process: after the key frame is selected, non-rigid registration is performed to tracking the nearby frames in both increasing and decreasing order. The increasing order is used as an example in the present disclosure. Assuming that the key frame index is n, and the i-th frame has been tracked. The transformation from the key frame to the (i+1)-th frame may be calculated.

The non-rigid transformation is described by K embedded deformation nodes (EDNodes), which is obtained by sampling on the key frame mesh. Each EDNode has a 3×3 affine matrix $A_k$ and a 3-dimensional translation $t_k$. The parameters to be solved constitute a set $G = \{A_k, t_k\}_{k=1}^{K}$. Each vertex of the mesh is connected to several EDNodes. Denote the set of EDNodes that are connected to the m-th vertex $v_m$ as $S_m$. Then the vertex $v_m$ is transformed to $$v'_m = \sum_{k \in S_m} w_k^n [A_k(v_m - g_k) + g_k + t_k]$$

And its normal $n_m$ is transformed to $$n'_m = \sum_{k \in S_m} w_k^n A_k^{-T} n_m$$

where $w_k^m$ is the weight of connection between vertex $v_m$ and the k-th EDNodes. In order to constrain the spatial smoothness of transformation, EDNodes are connected with each other which constitute an EDNode Graph. The set of EDNodes that are connected to the k-th EDNode as referred to as $N_k$.

Note that the way of sampling EDNodes, the construction of EDNodes graph and the way of connection between vertices and EDNodes are important to the performance of non-rigid registration. In the present disclosure, EDNodes on a mesh are uniformly sampled, and both geodesic distance and Euclid distance are considered to determine the connectivity and weights.

Specifically, EDNodes on the key frame mesh are uniformly sampled. Each EDNode randomly locates on a face of the mesh, and its possibility is proportional to the area of the face. Since the EDNodes locate on faces, the geodesic distance of EDNodes is represented by the geodesic distance of specific faces. The EDNodes graph is constructed by connecting each EDNode to the nearest $K_{neighbor}$ EDNodes, where the distance is measured by geodesic distance. Under the condition of the same geodesic distance, the EDNode with minimum Euclid distance is considered. After the EDNode graph is constructed, the average Euclid distance between connected EDNodes may be calculated and referred to as $\sigma$.

Then, each mesh vertex is connected to the $N_{neighbor}$ EDNodes with minimum Euclid distance, and the geodesic distance between mesh vertex and the connected EDNode should be smaller than a threshold $\eta$. This threshold may prevent a mesh vertex from being connected to a faraway EDNode. After the connectivity is determined, the weights are calculated as $$w_k^m = \frac{1}{Z}\exp(-\|v_m - g_k\|^2/\sigma^2)$$

where Z is a normalization coefficient guaranteeing that $\Sigma_{k \in S_m} w_k^m = 1$.

The non-rigid transformation is obtained by solving the following optimization problem $$E(G) = \lambda_{fit}E_{fit} + \lambda_{rigid}E_{rigid} + \lambda_{smooth}E_{smooth} + \lambda_{corr}E_{corr}$$

Assuming that the non-rigid transformation from key frame to the i-th frame have been determined and denoted as $G^i = \{A_k^i, t_k^i\}_{k=1}^K$. The non-rigid transformation from key frame to the (i+1)-th frame may then be solved and denoted as $G^{i+1} = \{A_k^{i+1}, t_k^{i+1}\}_{k=1}^K$. The transformation from key frame to the (i+1)-th frame may be represented as $A_k^{i+1} = A_k^i \Delta A_k$, $t_k^{i+1} = t_k^i + \Delta t_k$. In order to guarantee the temporal smoothness of tracking, for $G^{i+1}$ is not directly solved, but the transformation from i-th frame to the (i+1)-th frame $\Delta G = \{\Delta A_k, \Delta t_k\}_{k=1}^K$ is solved instead. Then $G^{i+1}$ may be determined from $G^i$ and $\Delta G$.

Here $E_{fit}$ is the fitting error term, expressed as $$E_{fit} = \sum_{m=1}^{M} \|n_m'(v_m' - x)\|^2$$

where $v_m'$ and $n_m'$ denote the transformed position and normal of the m-th mesh vertex, x is the nearest point to $v_m'$ on the input (i+1)-th frame mesh.

$E_{rigid}$ is the rigidity term, which is used to constrain the rigidity of affine matrices $\Delta A_k$, expressed as $$E_{rigid} = \sum_{k=1}^{K} \|\Delta A_k^T \Delta A_k - I\|_F + \sum_{k=1}^{K} (\det(\Delta A_k) - 1)^2$$

$E_{smooth}$ is the spatial smoothness term, which is used to make the transformation described by $\Delta G$ smooth, expressed as $$E_{smooth} = \sum_{k=1}^{K} \sum_{j \in N_k} \|\Delta A_j(g_k + t_k^i - g_j - t_j^i) + g_j + t_j^i + \Delta t_j - g_k - t_k^i - \Delta t_k\|^2$$

Note that $g_k + t_k^i$ is the transformed k-th EDNodes at the i-th frame, $g_k + t_k^i + \Delta t_k$ is the transformed k-th EDNodes at the (i+1)-th frame The last term $E_{corr}$ is the correspondence term. The correspondence information can be obtained by techniques like optical flow and human pose. It describes the matching relationship between some 3D points in the i-th frame and some 3D points in the (i+1)-th frame, denoted $\{c_p^i, c_p^{i+1}\}_{p=1}^P$, where P is the number of correspondences, $c_p^i$ is the position of the p-th correspondence at the i-th frame, called start point, $c_p^{i+1}$ is the position of the p-th correspondence at the (i+1)-th frame, called end point. Similar to the mesh vertices, each start point should be connected to several EDNodes. Euclid distance may be used to calculate the nearest $N_{neighbor}$ EDNodes. After determining the connectivity, the calculations of weights are the same as mesh vertices.

Then the transformed start point $c_p^{i\prime}$ is given by $$c_p^{i\prime} = \sum_{k \in S_m} w_k^p [\Delta A_k(c_p^i - g_k - t_k^i) + g_k + t_k^i + \Delta t_k]$$

where $S_m$ is the set of EDNodes connected to $c_p^i$, and $w_k^p$ are the corresponding weights.

In the present disclosure, iterative closest point (ICP) method may be used to estimate the non-rigid transformation. Specifically, the transformed mesh vertices are firstly calculated using current transformation $\Delta G$. Then the closest point in the (i+1)-th frame input mesh are obtained. Next, the optimization problem E(G) is solved to update $\Delta G$. The above process is repeated until some conditions are satisfied. Note that the optimization problem E(G) can be solved using non-linear optimization algorithms like Gaussian-Newton method.

Several features may be implemented to improve the accuracy for estimating the non-rigid transformation.

Relaxing of rigidity term and spatial smoothness term. In the iteration process, a large value is set to $\lambda_{rigid}$ and $\lambda_{smooth}$. When the value of energy E(G) nearly stay constant in the iteration process (for example, $$\frac{|E(G)^j - E(G)^{j-1}|}{E(G)^{j-1}} < 0.002,$$

where $E(G)^j$ is the value of E(G) at the j-th iteration), $\lambda_{rigid}$ and $\lambda_{smooth}$ (for example halve $\lambda_{rigid}$ and $\lambda_{smooth}$ as $$\lambda_{rigid} = \frac{\lambda_{rigid}}{2}, \lambda_{smooth} = \frac{\lambda_{smooth}}{2})$$

are then relaxed. Moreover, at least a predefined number of iterations (for example 5 iterations) are performed before the next relax. When the total iteration number reaches the preset maximum value or the times of relaxing reach the preset maximum value, the iteration process terminates.

Filtering the fitting error term. Notice that the fitting error term is calculate by finding the nearest points in the (i+1)-th frame input mesh. Some undesirable terms can degrade the performance. Bad terms are filtered to increase the robustness. Distance filter, normal filter and depth filter may be used. Specifically, for the distance filter, when the Euclid distance between $v'_m$ and x is larger than a threshold, it is filtered. For the normal filter, when the angle between normal $n'_m$ and the normal of x is larger than a threshold, it is filtered. For the depth filter, point $v'_m$ is projected to the observed depthmap, read the depth value and reproject it to obtain the 3D position $v''_m$. If the Euclid distance between $v'_m$ and $v''_m$ is larger than a threshold, then it is filtered.

Group switching process: it may be used to determine whether the tracking termination condition is met. When one or more specific conditions are satisfied, the tracking process terminates. The terminating conditions may include the following conditions.

Encountering a previously-tracked mesh. For example, in the current process the i-th frame may be tracked. If the i+1-th frame has been tracked before, then the tracking process may terminate.

Fitting error condition. For the transformed mesh vertex $v'_m$, calculate the nearest point x in the target mesh. If the Euclid distance between $v'_m$ and x is larger than a threshold (called fitting error threshold), then $v'_m$ is marked as fitting erroneous vertex. If the maximum connected component size of the fitting erroneous vertices is larger than a threshold (called fitting erroneous connected component size threshold), the tracking process terminates. Similarly, for each vertex of the target mesh $u_m$, calculate the nearest vertex y on the deformed mesh. If the Euclid distance between $u_m$ and y is larger than fitting error threshold, $u_m$ is marked as fitting erroneous vertex. If the maximum connected component size of the erroneous vertices is larger than the fitting erroneous connected component size threshold, the tracking process terminates. Note that, the fitting error can also be measured using point to face distance, for example $\|n'_m(v'_m-x)\|$.

Face stretch condition. For each face of a deformed mesh, if its stretch is larger than a predefined threshold (called the stretch threshold), it is marked as stretch erroneous face. If the maximum connected component size of stretch erroneous face is larger than a threshold (called the stretch erroneous connected component size threshold), then the tracking may terminate. The stretch is measured by the F-norm of face affine matrix.

Face flipping condition. For the deformed mesh, if the ray start from the face center point along the inverse face normal direction does not intersect with this mesh, this face is marked as flipping erroneous. If the maximum connected component size of flipping erroneous faces is larger than a threshold (called the flipping erroneous connected component size threshold), then the tracking may terminate. Note that the flipping condition may be suitable only when the keyframe mesh is a close mesh.

Poisson Surface Reconstruction

Poisson Surface Reconstruction (PSR) is applicable to 3D reconstruction, which involves creating watertight mesh surfaces from oriented point samples. Traditional PSR algorithm may encounter the following technical difficulties: first, the "bulging" artifact often arises in the regions where graphics data are missing; second, the same reconstruction depth is adopted for the entire space and thus high depth surface reconstruction at specific regions is not supported; and third, surface reconstruction of objects having low thickness (e.g., thin objects) may not be supported.

Provided in the present disclosure are technical solutions to the above-identified technical difficulties. For example, first, utilizing the shape from silhouette information to complement the missing data, and consequently reducing or eliminating the "bulging" artifacts; second, increasing the reconstruction depth at specific regions to improve the surface reconstruction accuracy; and third, moving the points of thin objects along the normal direction with a small distance, which makes it possible to reconstruct both side of the thin objects. Note that these technical solutions can be applied separately or in conjunction with each other.

Figure 11:
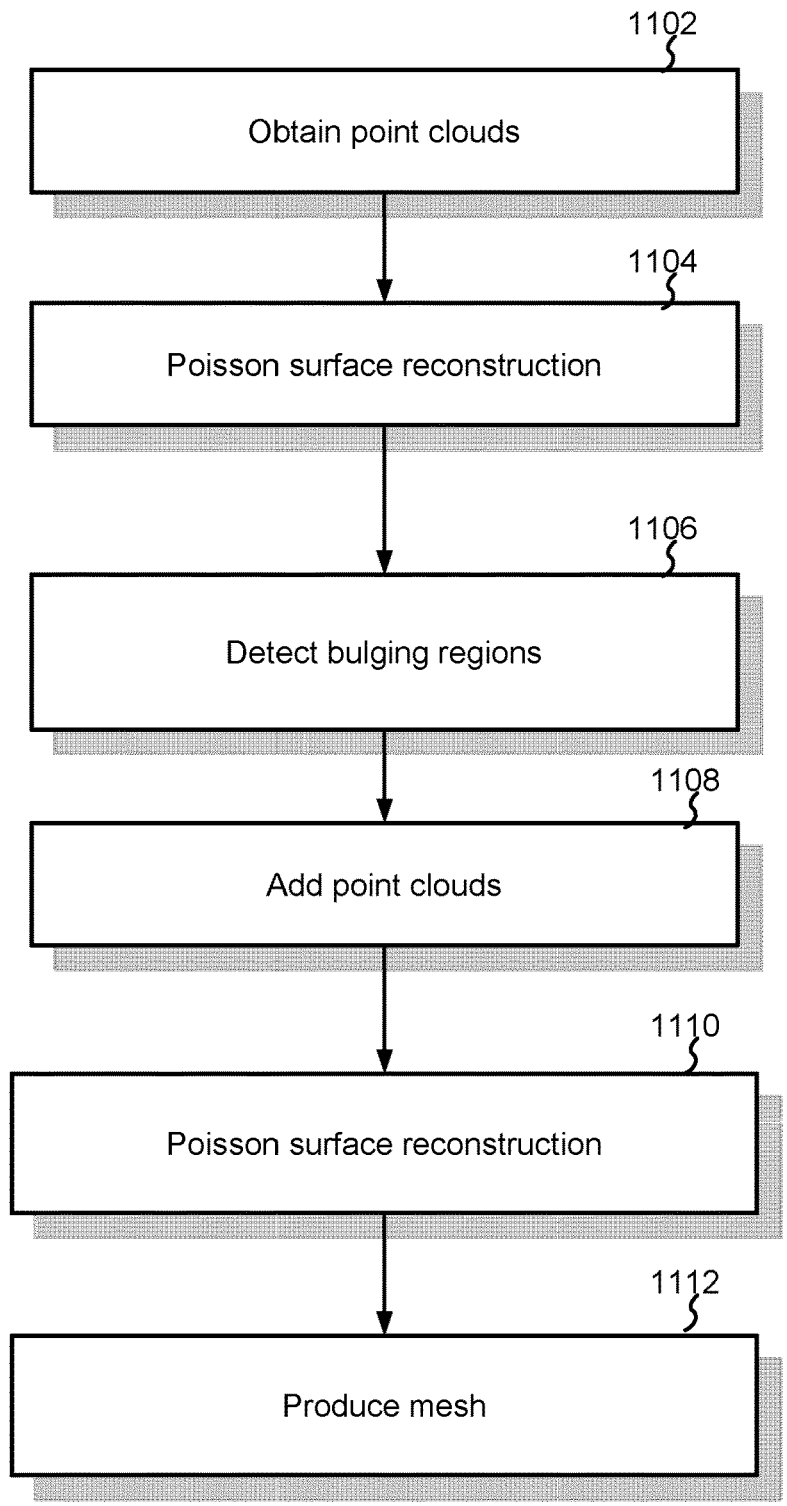
FIGS. 11-13 are flowcharts illustrating example methods for poisson surface video in accordance with some implementations.

FIG. 11 is a flowchart illustrating an example method 1100 for poisson surface reconstruction in accordance with some implementations. The method 1100 may be applied to reduce or eliminate the "bulging" artifacts at regions where graphics data are missing.

An example method may include first solving a poisson surface reconstruction problem with input point cloud and obtaining the indicator function. "Bulging" regions are then identified based on shape from silhouette information. For each detected "bulging" region, the original point cloud may be complemented with sampled points on the shape from silhouette mesh. Another poisson surface reconstruction may be applied to the complemented point cloud.

In some implementations, the method 1100 may include the following steps. A mesh surface may be identified (1102) from existing point clouds using existing PSR technologies. "Bulging" regions are then identified (1104) from the mesh surface. Because the "bulging" effect is caused by the lack of relevant graphics data, the shape from silhouette information may be used to detect (1106) the "bulging" regions. The shape from silhouette may be obtained from multi-view background masks, which are located at the outer side of the true surface definitely.

If the shape from silhouette is found on the inner side of the reconstructed surface, then it indicates that the corresponding region is suffering from "bulging" effect caused by missing graphics data. Points on the shape from silhouette mesh (for example, the center point of each face of the shape from silhouette mesh) are sampled.

For each sampled point, the voxel it belongs to is identified. If a voxel is located on the inner side of the reconstructed surface (e.g., because the indicator function values at the eight grids of this voxel are all smaller than surface isovalue), the sampled point is reserved.

All of the reserved sampled points (1108) and the original point clouds (1102) may be used to form new point clouds. A new surface mesh may then be produced (1112) from the new point cloud after applying (1110) a PSR method to the newly-formed point clouds.

Figure 12:
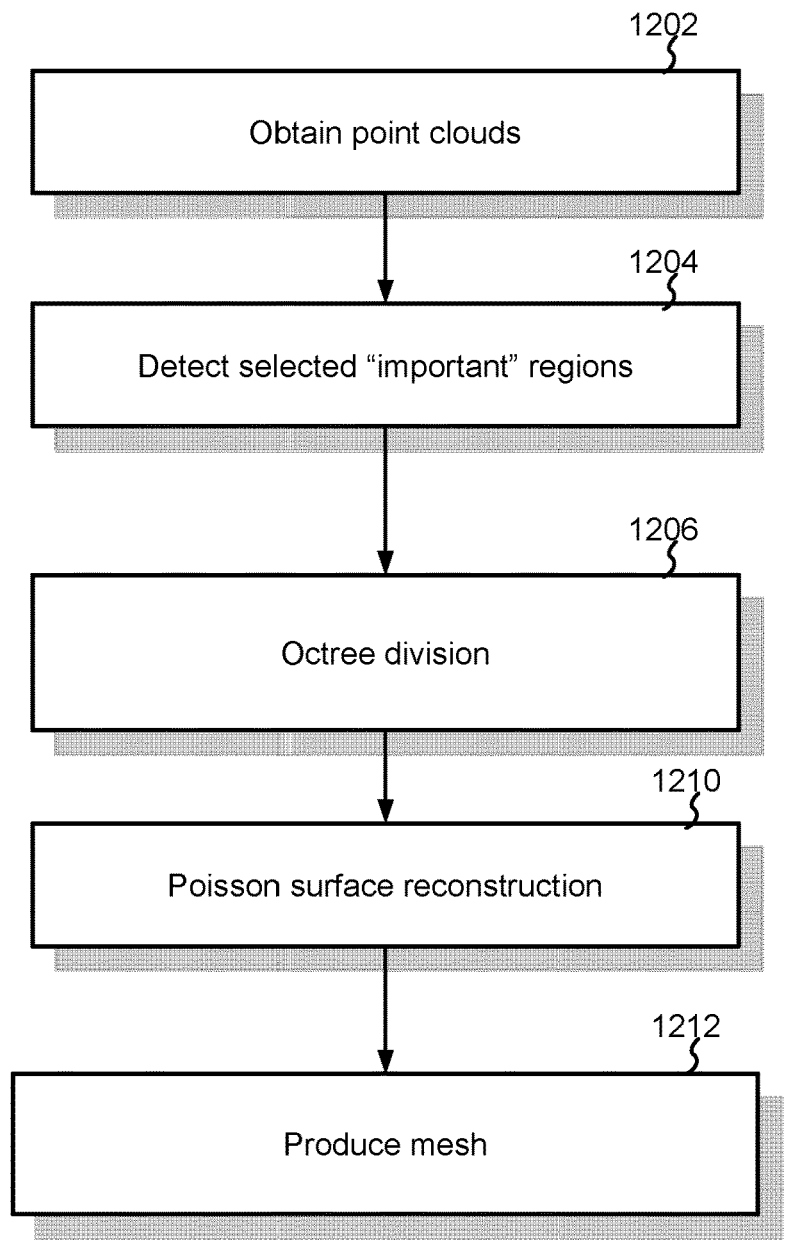

FIG. 12 is a flowchart illustrating an example method 1200 for poisson surface reconstruction in accordance with some implementations. The method 1200 may be applied to support high depth surface reconstruction at selected regions.

An example method may include first identifying "important" regions. In the present disclosure, a region may be deemed important if it corresponds to (e.g., includes or identifies) a human body part, such as a human face or a human hand or the region is specifically identified by a user.

For each important region, a high depth octree division may be adopted; and a surface mesh is obtained by solving a PSR problem.

In some implementations, the method 1200 may include the following steps. Important regions, such as a human's face or hands as well as regions selected by a user, are first identified (1202). For example, a human's facial regions may be identified based on projecting points (or pixels) to one or more multi-view images. If a projected point is located within a human's facial region on a predefined number of images (as defined by a user or by a computer system), then the projected point may be marked as an important point.

For each important point, a higher depth may be used at the octree division step (1206). In some cases, the total number of points to be projected may be large. To expedite the projection process, the follow process may be implemented. First, an octree division is performed using the original depth to produce grids. The grids are then projected to the multi-view images. If a projected grid is located within a human's face region on a predefined number of images, the grid may be marked as an importance grid. If the eight grids of a voxel are all marked as importance grids, the voxel is marked as an important voxel. The important voxels may be further divided until reaching the predefined depth.

In accordance with the new divided octree, a surface mesh may be constructed (1212) using conventional PSR methods (1210).

Figure 13:
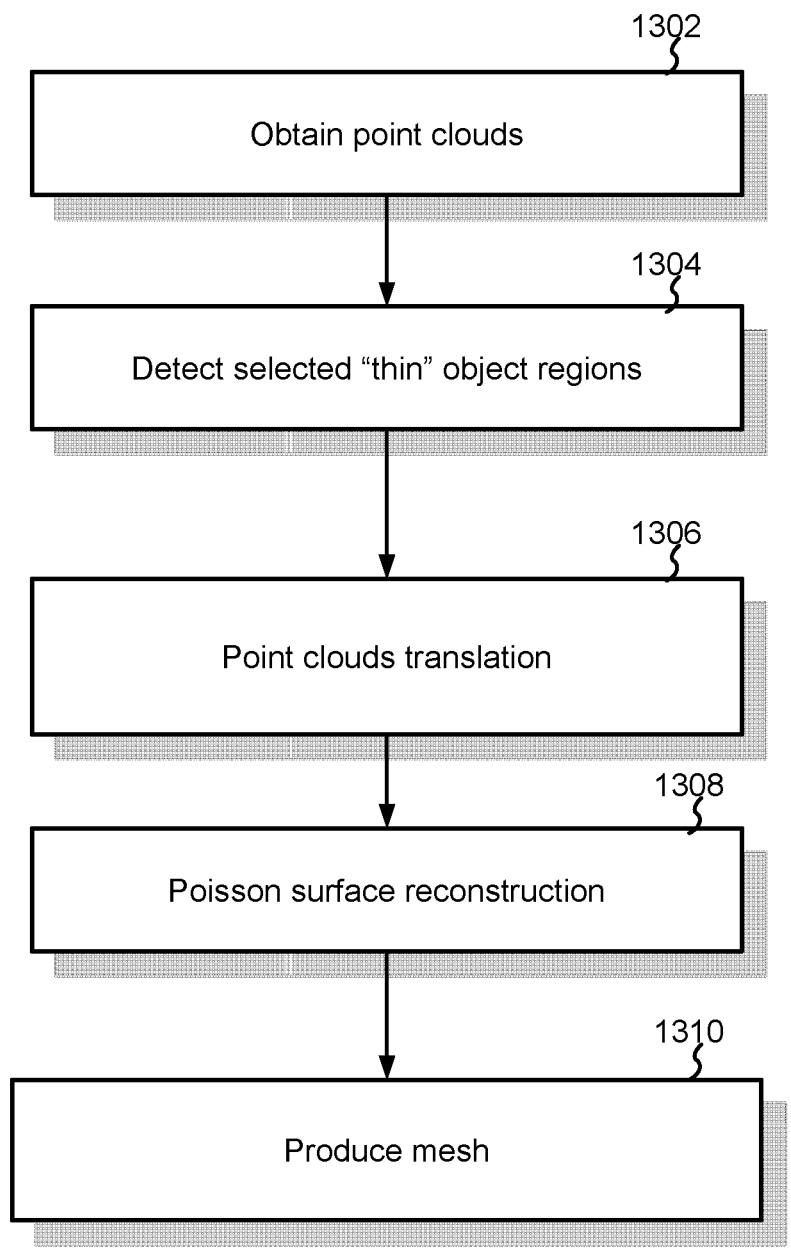

FIG. 13 is a flowchart illustrating an example method 1300 for poisson surface reconstruction in accordance with some implementations. The method 1300 may be applied to reconstruct the surface of a "thin" object (e.g., an object that has a thickness that is below a predefined value).

An example method may include first detecting the regions with a thin object. Then, points of the thin object may be moved along the normal directions within a predefined proximity from their original locations (also referred to a small distance). Next, the translated point cloud may then be solved using a PSR method.

For a point cloud of a thin object, the points with inverse normal (which are generally located on both sides of the thin object) may be located at the same voxel of octree (1302). The contributions of points located in a same voxel are often averaged, which may cause the surface to become unable to be constructed using a PSR method.

In some implementations, the method 1300 may include the following steps. Regions with a thin object are identified (1304) and moved along normal direction, such that the points with inverse normals become located at different voxels. Specifically, an octree division may be performed. Each voxel may include a number of points located within the voxel.

For each pair of these points, if the inner production of normals is smaller than a predefined threshold (which may mean that the angle of normals is larger than the predefined threshold), the points in the point-pair are marked as points that need to be moved.

Each point that has been identified as to be moved may then be moved (1306) along the normal direction within a proximity, which may be specified by a user or automatically calculated by a computer system. For example, the proximity may be the minimum edge length of a voxel.

After the points are moved, a surface mesh may then be constructed (1310) based on the moved point cloud using a PSR method (1308).

Low Bit-rated 3D Dynamic Reconstruction and Transmission

Despite the growth of Dynamic 3D reconstruction techniques, robust technologies for supporting real-time reconstruction and low bitrate streaming are still lacking. Some existing methods, e.g., the Fusion4D method, can provide a merely 2 Gbps bitrate, making it impossible to stream over the Internet.

With the constraint of real-time reconstruction, the key to lower the bitrate may lie in constructing a mesh parameterization module, a texturing module and a compression module, with good performance, but low complexity.

Mesh parameterization is the process for projecting a 3D mesh onto a 2D plane, keeping the original connectivity with less distortion in each face. Traditionally, in application with different types of complex models, the mesh parameterization requires a significant amount of sophisticated computation and optimization. Some existing methods, e.g., the UV Altas method by Microsoft, requires needs up to ten second to generate the UV coordinates for a normal-sized mesh (e.g., a mesh with 20,000 faces), which is unsatisfactory for Internet-based real-time streaming applications.

Technologies described in the present disclosure may provide the following technical advantages. First, higher performance may be achieved processing a mash by implementing computing pipelines and parallel computing, without resulting in noticeable quality loss. Second, with the fast development of 3D reconstruction technology, the precision of reconstructed model has increased significantly, making it optional to conduct complex computations, such as camera and model fine tune, as required in previous implementation. Reducing or eliminating these optional steps may further increase streaming performance.

Figure 14:
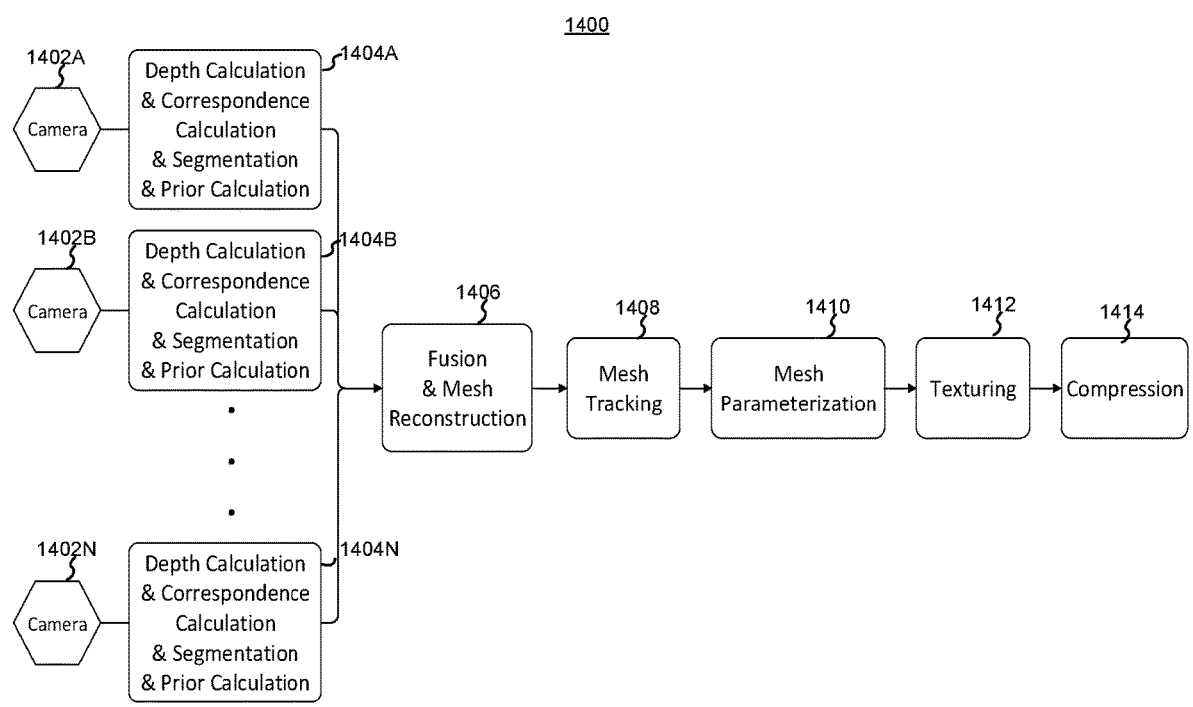
FIG. 14 is a flowchart illustrating an example method for low bittrated 3D dynamic reconstruction and transmission in accordance with some implementations.

FIG. 14 is a flowchart illustrating an example method 1400 for low bitrated 3D dynamic reconstruction and transmission in accordance with some implementations.

Several cameras (e.g., cameras 1402A, 1402B . . . and 1402N) may be used to produce original video streams. Using depth calculation, correspondence calculation, segmentation, and prior calculation (e.g., 1404A, 1404B . . . and 1404N), data included in each video stream may be fused together and a mesh may be reconstructed (1406) in accordance with the fused data.

Mesh tracking may then be applied (1408) to produce as many topological consistent meshes as possible. Mesh parameterization (1410), texturing (1412), and mesh compression (1414) may then be applied.

Figure 15:
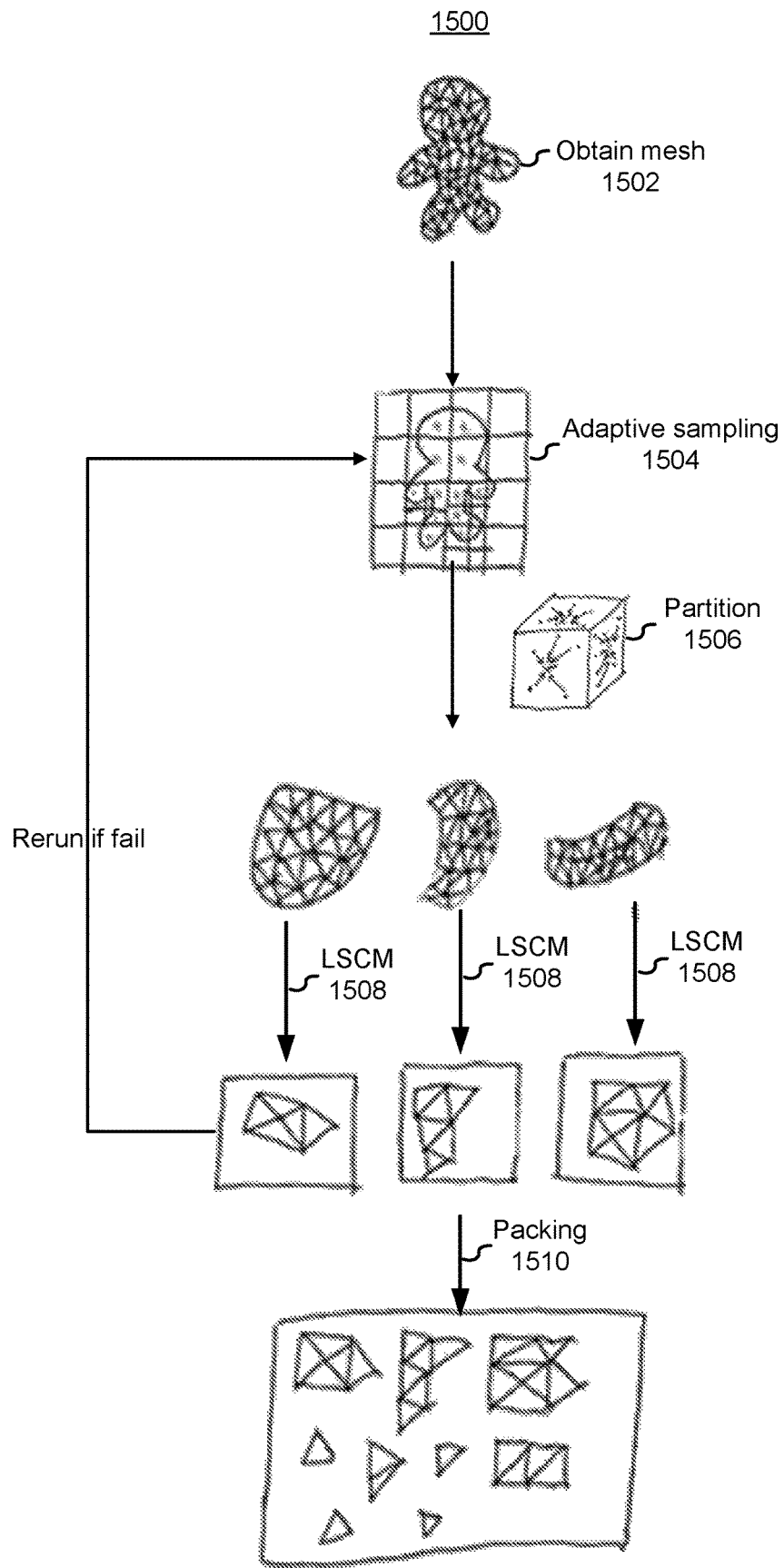
FIG. 15 is a block diagram illustrating an example workflow for mesh parameterization in accordance with some implementations.

FIG. 15 is a block diagram illustrating an example workflow 1500 for mesh parameterization in accordance with some implementations. The workflow 1500 may include the following steps: sampling, partition, segment clean, parameterization, and packing.

In some implementations, a non-uniform sampling on a mesh surface is first carried out (1502). Sample more points (1504) on curly (e.g., bumpy or non-flat) regions can produce smooth, disk-like segments, which may produce better parameterization results.

As part of the partitioning (1506), each facet is classified based on its distance to the sampled points and its distance to a sampled plane. After the partitioning, segments are collected, and unconnected components are separated. A further clean-up step is conduct to remove parts with complex geometry (e.g., self-intersections, manifold faces, and ring-like regions).

Each segment is then parameterized. If a segment fails to be parameterized, the segment is deemed a complex mesh and is broken down into simpler segments by repeating the steps 1504, 1506, and 1508 on the segment. The total number of complex meshes is usually small and thus the parameterization may be completed at a high speed. The generated charts may then be packed into a single map with a greedy algorithm.

An example mesh parameterization process is described in more detail below.

Sampling: a fast mesh decimation-like algorithm may be used to sample points on a mesh. The mesh may be divided with into uniform grids with multiple Levels of Details (LODs), which forms a tree structure. In each detail level from top to bottom, quantic error is calculated to measure the complexness of triangles within a grid. If the error value is less than a predefined threshold (or it's the last detail level), one sample point is placed inside the grid. Otherwise, quantic error for each child grid inside the grid is calculated to determine whether the predefined threshold is met or not.

In these ways, non-uniform sample points are selected based on the complexity of s surface area. The error threshold value can be used to control the number of sampled points. Furthermore, the algorithm can be optimized for parallel execution on GPUs.

Partition: a mesh may be partitioned based on the sampled points. For each triangle on the mesh, both the distance from triangle's vertices to the sampled point (the P2P distance) and the distance from the sampled point to the triangle's plane (the P2F distance) are used to classify all triangles into one corresponding sample point.

The P2F distance is calculated in order to make the partitioned results more flat, resulting in better parameterization performance. In some implementations, a KD-Tree is used to select a predefined number (e.g. 8) of nearest sampled point for each triangle (P2P distance), the P2F distances of the selected points are then compared. The partition algorithm can also be optimized for parallel execution on GPUs.

Segmentation: some partitioned segments may contain complex geometry and thus need to be further partitioned, while other partitioned segments are sufficiently small and simple, such that they can be merged to form a bigger segment.

A Union-Find algorithm may be used to identify both the complex segments and the simple segments. For example, each triangle in a mesh is labeled with a unique tag (union with only itself). For each edge, consider the two facets on each side, their unions are merged if and only if the two facets have been partitioned into the same segment during the segmentation process. Using the same unions again, merge two segments if (1) the segments are both small and (2) the production of their normal vectors is more than a predefined threshold.

Parameterization: Least Square Conformal Mapping (LSCM) may be applied to compute the 2D coordinates of each segment. If a segment fails this step, it is sent back to for re-sampling and re-partitioning until the new segment can be parametrized. In some implementations, a segment may be deemed as failing to be parameterized if any of the following conditions is met:
the fitting error returned from the LSCM is greater than the predefined threshold; or
the resulting 2D coordinates creates overlapping (which may be detected using OpenGL rendering pipeline).

Packing charts into one map: this process may include a pre-calculation process and an arrangement process.

An example pre-calculation process may be as follows:
rescaling each chart with respect to its segment area in a 3D space sum of all facets);
generating a tight bounding box around each chart according to its coordinate;
rotating the bounding box, if the width of the bounding box is greater than its height; and
ranking the charts in a queue in accordance with their areas from large to small.

An example arrangement process may be as follows:
selecting one or more charts from the queue (produced in the pre-calculation process) to form the first line of the final map,
arranging the selected charts closely one by one from left to right without overlap; the total number charts selected may be set to half of the square root of the total number of the selected charts; and the width of the final map is limited by length of the first line, and no chart is placed outside the final map;
updating the contour of the bounding boxes of all packed charts, and updating the chart queue until the queue is empty, which means the arranging process is complete;
calculating the smallest gap on the contour:
if there exists one chart in the queue with the smaller width of its bounding box to fit in the gap, then placing the chart in the gap and repeating the "arranging the selected charts";
if no chart can fit into the gap, filling in the gap with its neighbors and repeating the "arranging the selected charts";
setting the height of the final map as equal to the height of the contour; calculating the final coordinates for all vertices; and updating the original mesh accordingly.

Figure 16:
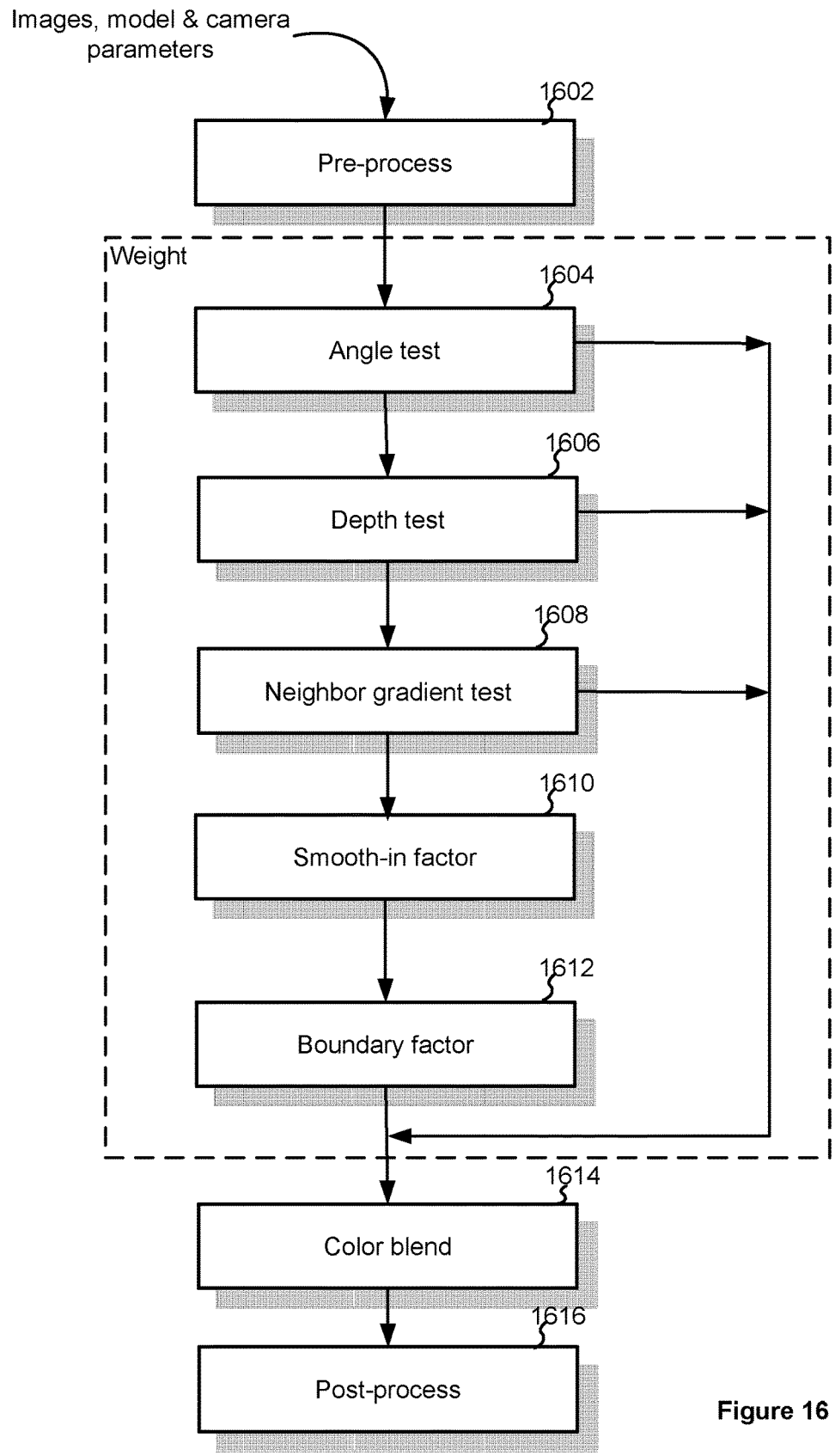
FIG. 16 is a flowchart illustrating an example method for texturing in accordance with some implementations.

FIG. 16 is a flowchart illustrating an example method 1600 for texturing in accordance with some implementations.

As explained below, the method 1600 is not demanding on the configuring the cameras. The some implementations, a total number of 8 to 20 cameras with 2048*2048 resolutions are used to cover a sufficient number of positions of an object. To capture the details of an object, long focus lens may be used to provide high frequency component. Precise camera calibration and synchronization, as well as high quality color agreement and white balance may produce improved results.

The method 1600 may include a pre-processing step (1602) in order to provide fast computation results. The pre-processing may include:
loading the 3D model and RGB images captured by the cameras;
calculate a depth map for each camera with extrinsic and intrinsic matrices;
applying bilateral filter to the depth maps; and
computing the gradient maps of depth based on the filtered depth maps.

The texturing may be conducted in parallel. In some implementations, for each pixel in the final texture map, computing its color in parallel using a GPU, as follow:
computing the weight of each camera, including:
computing the angle (1604) between the normal of the position to which the pixel corresponds (e.g., the normal of the pixel) and the camera direction. If the angle is greater than 90 degrees, the weight is set as zero;
computing the depth (1606) of the position to Which the pixel corresponds. If the depth is greater than the value as the position projected to the depth map of the camera (and in some implementations, with a small bias, e.g., 1 mm), the weight is set as zero; and projecting the position to the gradient map and determining its position, which may include:

searching in the neighborhood (1608) with the radius of 10 pixels. If there are more than ten values larger than a certain threshold (1 cm), the weight is set as zero;

searching in the neighborhood with the radius between 10 pixels and 30 pixels. If there is no value greater than the threshold (1 cm), the weight is set as the cosine of the angle between the normal of the pixel and the camera direction;

If there are values greater than the threshold (1610), determining the shortest distance to these values (referred to as d1), the weight is set as the cosine of the angle between the normal of the pixel and the camera direction times a factor s1:

$$s1 = \frac{d1 - 10}{20}$$

If the pixel lies on the boundary (1612) of the corresponding camera (within 40 pixels), an extra factor s2 will be multiplied:

$$s2 = \frac{d2}{40}$$

d2 is the distance to the nearest image boundary; and

The method 1600 may include a color blending step. The final color is produced based on the blended result of the camera RGBs weighted by the weight computed above. If long-focus camera is used, only its high frequency component should be considered. General 4*4 high pass filter may be applied to extract the high frequency components.

The method 1600 may include a post-processing, e.g., inpainting, step. For example, for each frame in the sequence, a mesh is generated using a 3D reconstruction method. The color of the mesh is saved in a corresponding UV texture map. The texture map is unwrapped from the mesh and split into multiple atlases. An incomplete texture map can be obtained from colored photos of the scene, leaving the occluded part as "Unknown."

Temporal inpainting may require a mesh sequence to be separate into groups. Each group may include one or more continuous frames. Meshes in a group are unwrapped in the same way, such that the pixels in the same position of all UV texture maps in the same group are mapped to a same part of the object being reconstructed.

A temporal inpaint pattern and a temporal inpaint mask may then be calculated for each group as follows.

For each pixel in a texture map, if it is known in all frames in the group or it is unknown in all frames in the group, the pixel is marked as "false" in the mask, which means the pixel is not to be inpainted.

Otherwise, the pixel is marked as "true" in the mask and the pixel may be inpainted; the mean color of all known frames is stored in the inpaint pattern of this group. Median color or other ways to determine the inpaint color may also be used instead of the mean color.

A spatial inpaint may also be performed before the temporal inpaint pattern is applied to the frames. An example spatial inpainting process is as follows:

down-sampling the texture map, which may be optional, may be used to reduce the time needed for spatial inpainting;

during the unwrapping of the 3D mesh, some vertices may have multiple corresponding UVs in the texture map. For these vertices, if some of the corresponding texture pixels are marked known and some marked unknown, the unknown pixels are filled with the mean color of the known pixels;

applying a 2D inpainting algorithm (e.g., the Telea algorithm) to each atlas of the texture map. The inpainting is limited to the inside of one atlas. When inpainting a pixel, therefore, all reference pixels are selected from the same atlas, and pixels that do not belong to the atlas is deemed as unknown;

repeating the unwrapping process and the inpainting process, until no more pixel may be inpainted;

scanning edge pixels of atlases in the texture map. Atlas edges are mapped to texture borders on the mesh during the unwrapping process. For a closed mesh generated from a real object, each edge must exist in 2 different triangles. The edge of an atlas corresponds to another edge of the atlas, and for each edge pixels of atlases, a corresponding pixel in the texture map can be located. If an edge pixel is unknown originally and becomes inpainted in the steps described above, its color is set to the mean color of itself and its corresponding pixel;

marking all pixels which are unknown before the unwrapping process and not an atlas edge pixel as "Unknown"; and repeating the inpainting process described above; and if a down-sampling process was conducted, up-sampling the inpainted result, and pasting the inpainted area from the up-sampled texture to the original texture.

The temporal inpaint pattern is then applied to the per-frame spatial inpaint outputs. For each frame, identifying all pixels which was unknown before the spatial inpainting and marked as "true" in the temporal inpaint mask of the corresponding group. For these identified pixels, applying a Poisson Editing method to blend the color from the temporal inpaint pattern to the spatial inpainted texture map to produce an output frame.

Figure 17:
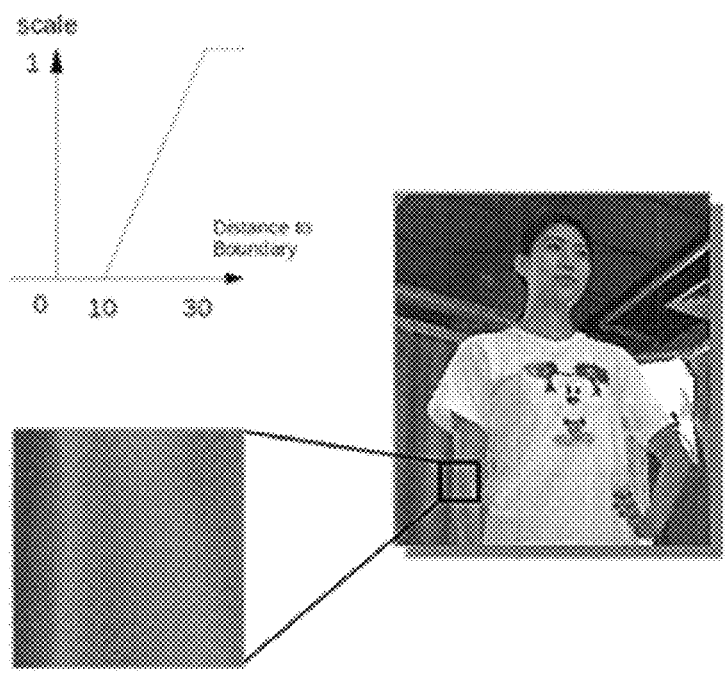
FIG. 17 is a block diagram illustrating an example boundary factor extension in accordance with some implementations.

Padding: a chart in the final texture map may be extended for 10~30 pixels with boundary color. An example boundary factor extension 1700 is illustrated in FIG. 17 in accordance with some implementations.

Figure 18:
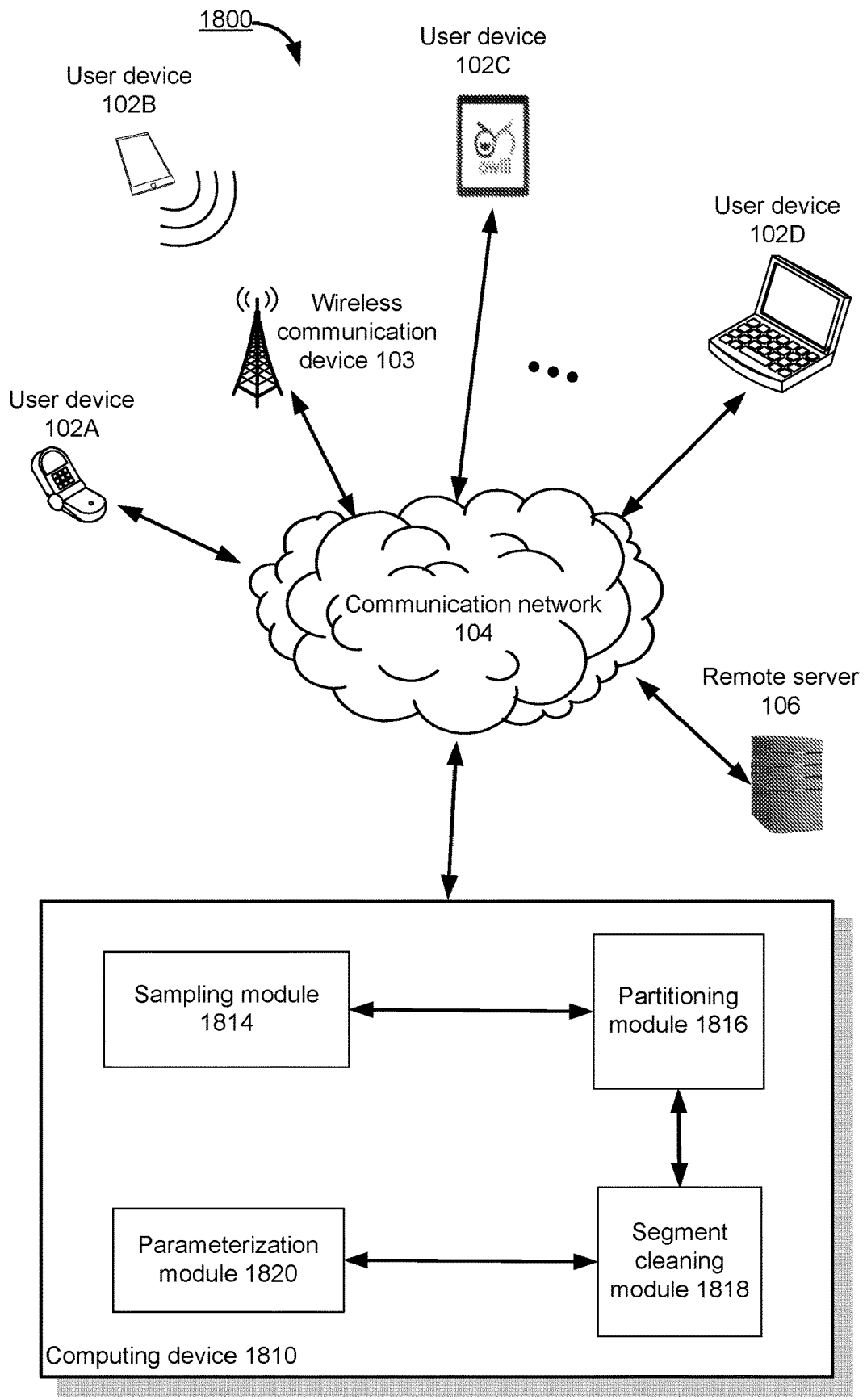
FIG. 18 is a block diagram illustrating an example system for 3D dynamic reconstruction and transmission in accordance with some implementations.

FIG. 18 is a block diagram illustrating an example computing system 1800 for low bit-rated 3D dynamic reconstruction and transmission in accordance with some implementations. Components shown in FIG. 18 and identified by the same reference numbers as those identified in other Figures (e.g., user deice 102A-102D) may provide same or similar functionalities as those components. The computing device 1810 may include a sampling module 514, a partitioning module 516, a segment cleaning module 518; and a parametrization module 520.

The computing device 1810 may perform one or more of the low bit-rated 3D dynamic reconstruction and transmission functionalities described with reference to FIGS. 14-17.

Mobile Mixed Reality Content Generation, Display and Interaction on a Mobile Device Augmented Reality (AR) technologies may be applied on mobile devices. For example, a user can activate a smart phone's camera, and if the camera captures a table, the user can graphically place a cartoon character or a rainbow on the table. The composite image appears that the cartoon character or the rainbow exists in the real world the same way the table does.

Generating AR content having dynamic content (e.g., a cartoon character that keeps making movements) or interacting with such AR content may, however, be technically challenging.

In the present disclosure, provided are technologies that capture 3D hologram/model to enable the creation of 3D dynamic mixed reality content as well as technologies for displaying the mixed reality content and for enabling a user to interact with the displayed content.

3D dynamic mixed reality content may be created in at least two ways: performance capture and motion capture and re-target. When conducting motion capture, especially when creating models, two different ways may be provided: auto-rigging a pre-scanned 3D model and using a single image or video to fit an existing model.

Figure 19:
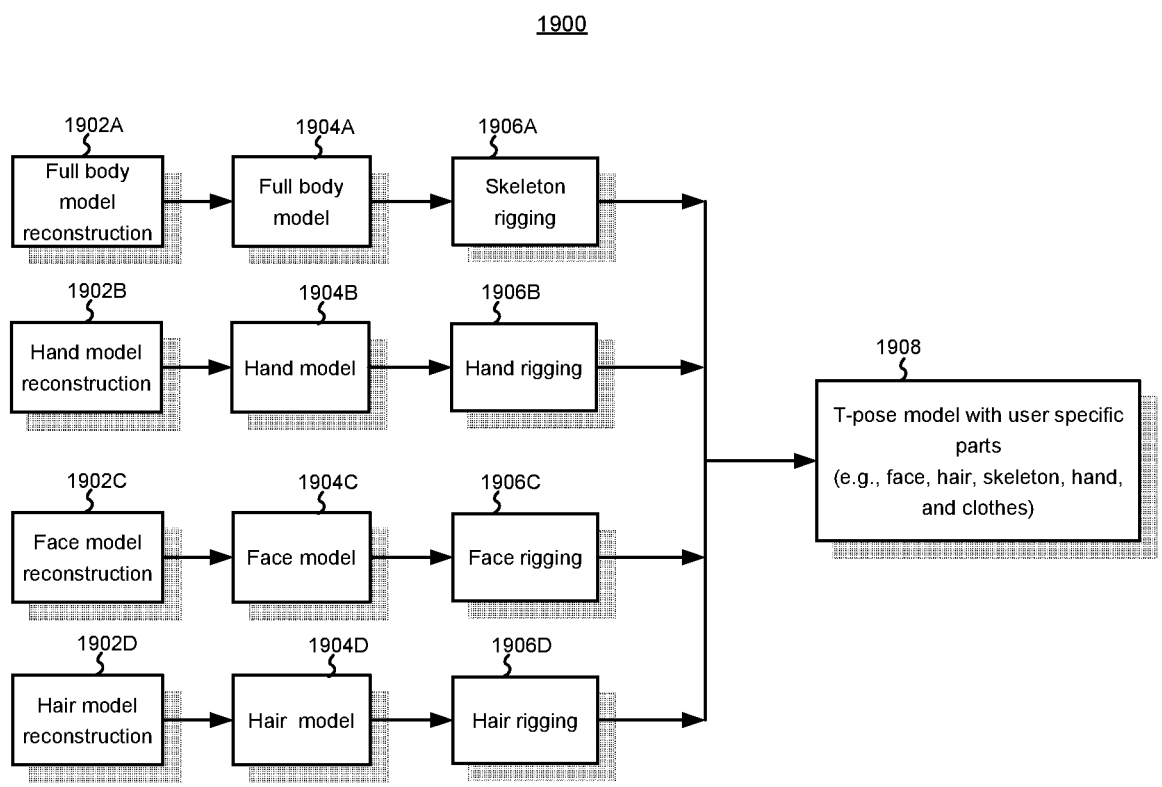
FIG. 19 is a flowchart illustrating an example method for mixed reality content processing on a mobile device in accordance with some implementations.

FIG. 19 is a flowchart illustrating an example method 1900 for mixed reality content processing on a mobile device in accordance with some implementations.

As seen, the full body reconstruction may build full body model and then a skeleton (1902A, 1904A, and 1906A); the hand reconstruction may build a hand model and then a hand rigging (1902B, 1904B, and 1906B); the face reconstruction may build a face model and then a face rigging (1902C, 1904C, and 1906C); and the hair reconstruction may build a hair model and then a hair rigging (1902D, 1904D, and 1906D). By using the auto-rig method, the body can be rigged. A user's hand, face, and hair may also be constructed.

After constructing these models, an ICP-based method can be used to register and stitch the models together to produce a T-pose human model with rigged body, face, hand and hair (1908).

Figure 20:
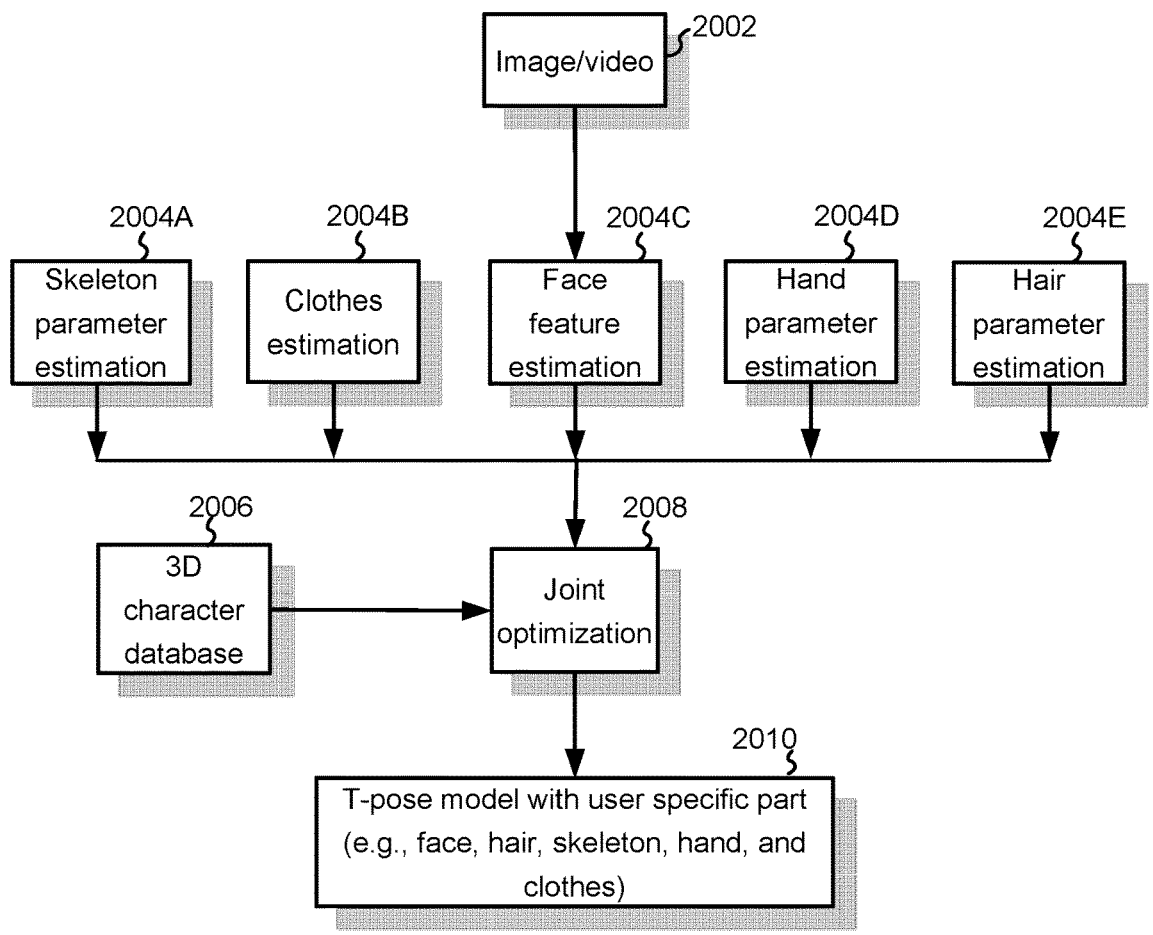
FIGS. 20-24 are flowcharts illustrating example methods for mixed reality content presentation and interaction on a mobile device in accordance with some implementations.

FIG. 20 is a flowchart illustrating an example method 2000 for mixed reality content presentation and interaction on a mobile device in accordance with some implementations.

The method 2000, a data-driven method, uses a single image or video to fit an existing model. A database providing topology-consistent 3D human models that are already rigged may be provided. The database supports a linear model so that by changing some parameters, the model's height or weight can be tuned. Based on the database, by analyzing the photo or video, parameters of the human body, clothes, face expression, hand and hair may be estimated. The parameters may be provided, as input, to the database in order to produce a T-pose human model with rigged body, face, hand clothes and hair. The model produced by this method is more cartoonish.

Figure 21:
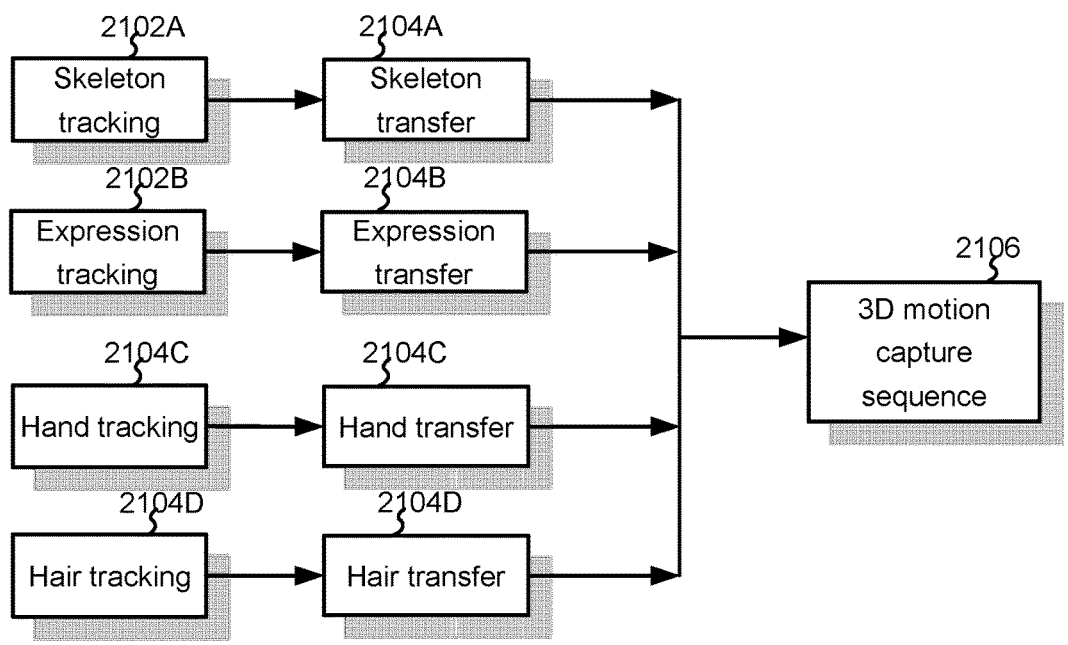

FIG. 21 is a flowchart illustrating an example method 2100 for mixed reality content presentation and interaction on a mobile device in accordance with some implementations.

The method 2100 is an action caption method, which may be used in addition to the methods 1900 and 2000. As shown in FIG. 21, the method 2100 includes skeleton tracking, expression tracking, hand tracking, and hair tracking.

Figure 22:
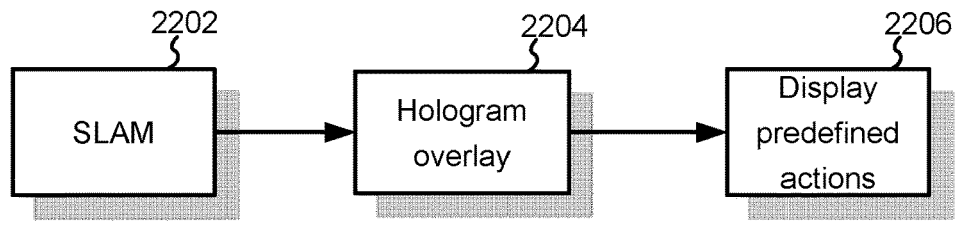

FIG. 22 is a flowchart illustrating an example method 2200 for presenting mixed reality content on a mobile device in accordance with some implementations.

The method 2200 uses a SLAM algorithm (2202) to generate a sparse 3D map of a whole space, before placing (2204) the 3D hologram on some planes. At step 2206, the 3D dynamic hologram is displayed on a mobile device.

Figure 23A:
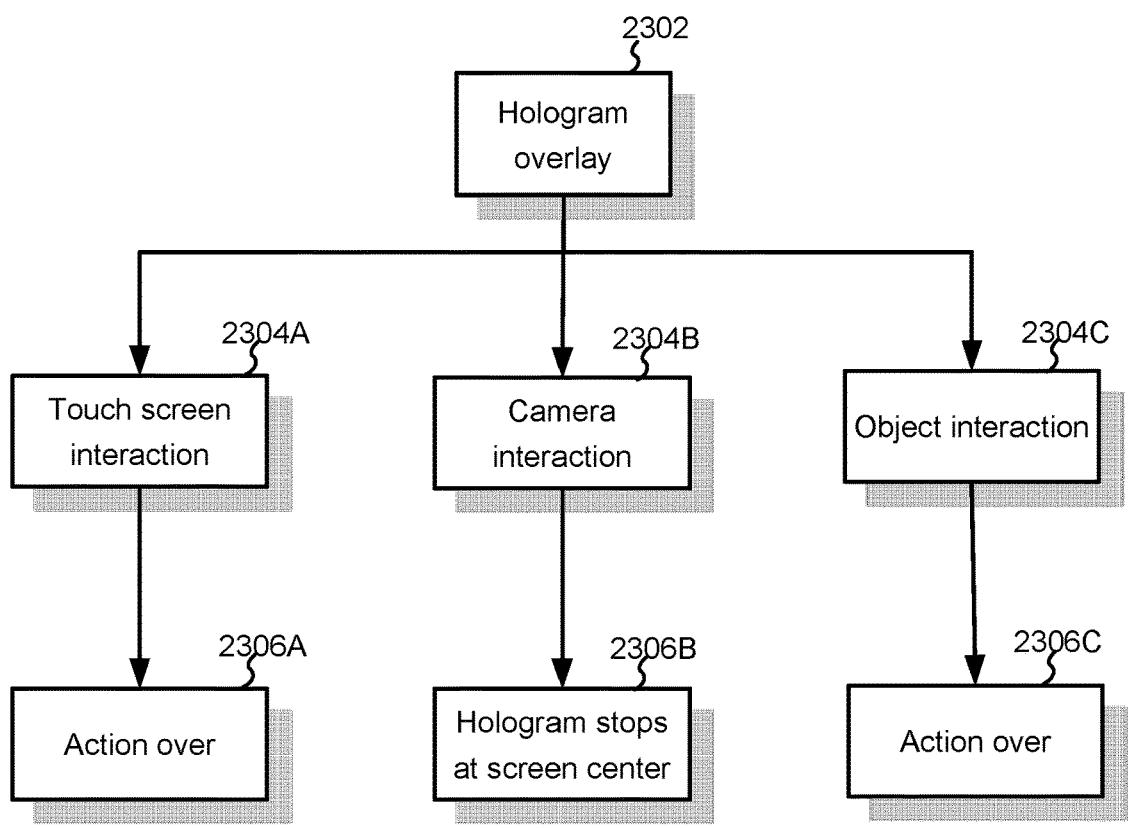

FIG. 23A is a flowchart illustrating an example method 2300 for interacting with mixed reality content presentation on a mobile device in accordance with some implementations.

The method 2300 may use a SLAM algorithm to obtain a sparse 3D map and place the 3D hologram to an initial position. Then, three types of interactions may be provided: touch screen interaction, camera interaction, and object interaction.

Touch screen interaction supports a user's single finger touch, multiple finger touch, touch to set route and choose list, etc. to control the movement of a hologram character from one location to another along a specific route.

The camera interaction means when a user moves a mobile device (e.g., a smart phone) and regardless how the scene captured by the camera changes, the hologram will remain at the center of scene as captured the camera.

Object interaction may include detecting collision that happens in a scene captured by a camera. When detecting that another object is coming into the scene either from a side direction or from the top to the bottom, the method 2100 may generate the hologram character's reactions thereto. In addition, it also supports advanced actions such as grabbing a 3D hologram character.

Figure 23B:
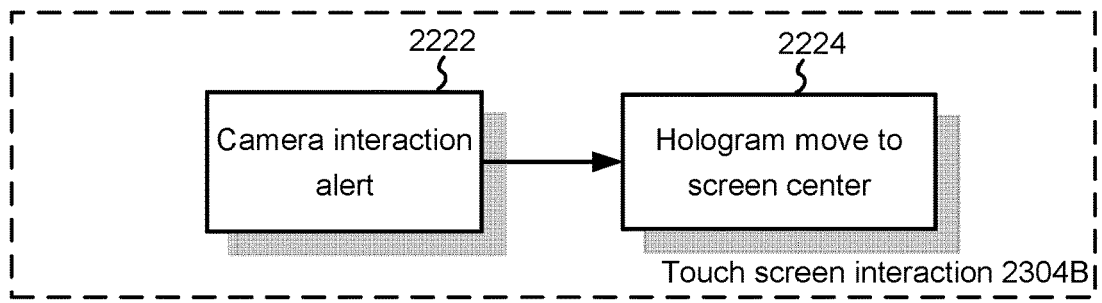

FIG. 23B is a flowchart illustrating an example method 2304B for interacting with mixed reality content on a mobile device in accordance with some implementations.

Figure 23C:
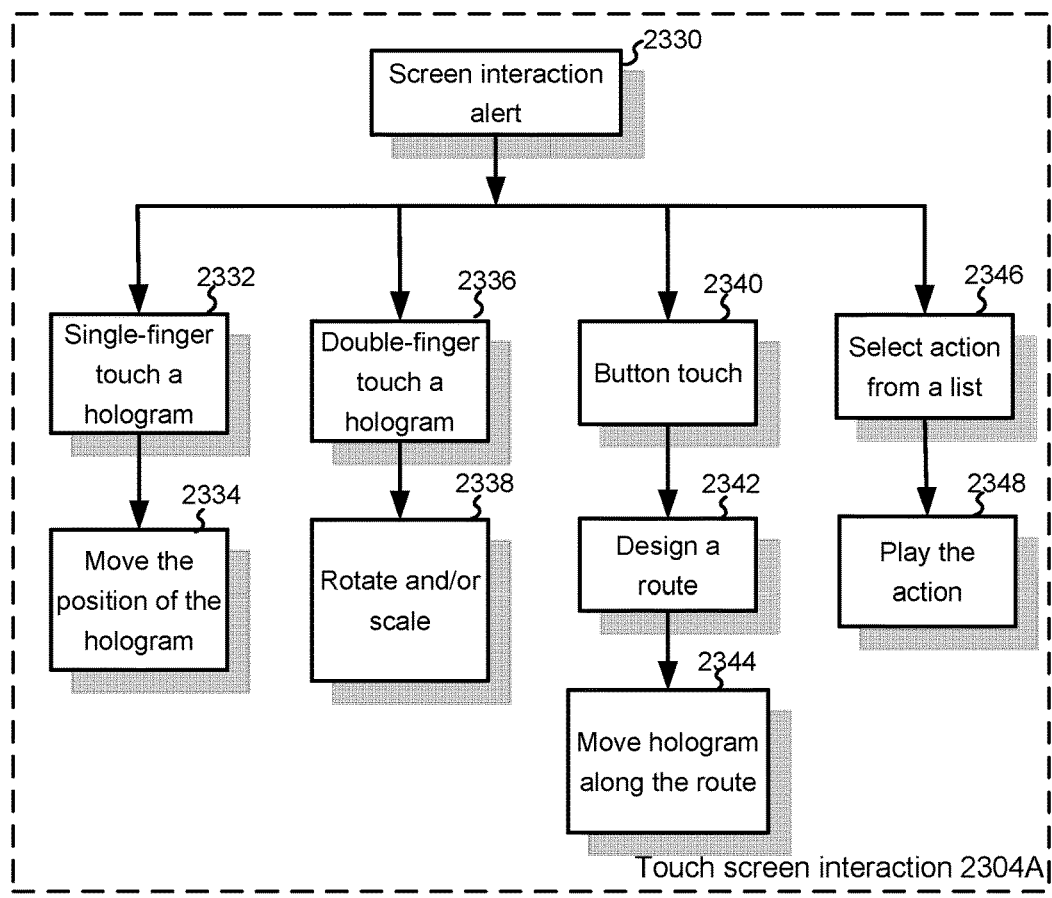

FIG. 23C is a flowchart illustrating an example method 2304A for interacting with mixed reality content on a mobile device in accordance with some implementations.

Figure 23D:
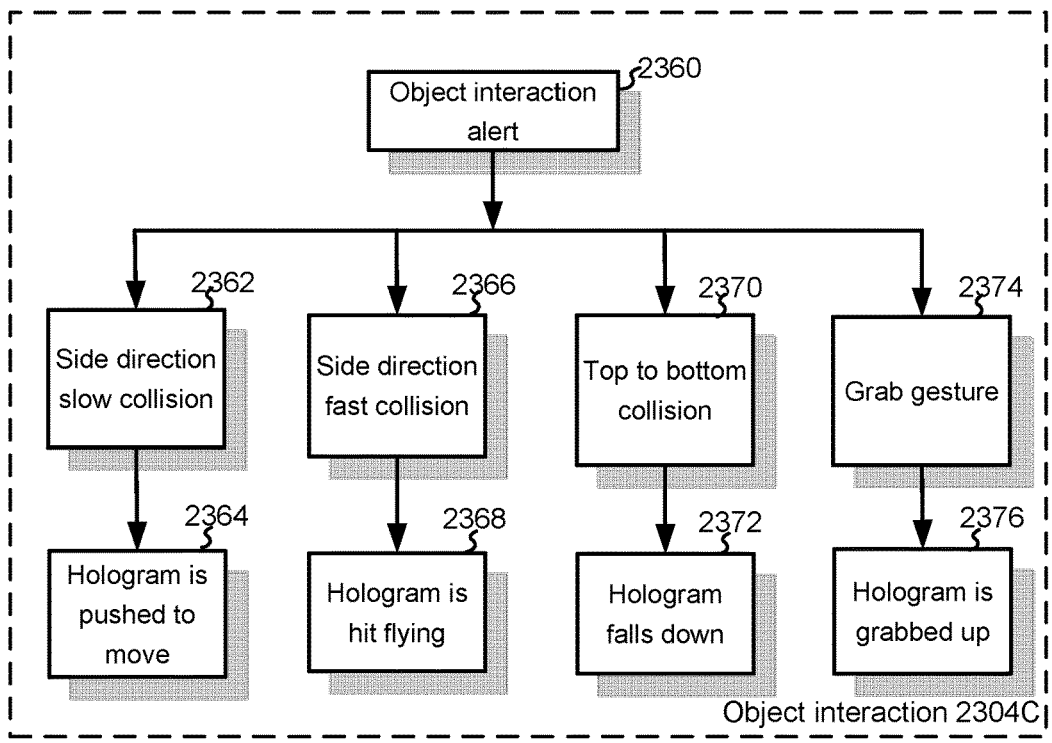

FIG. 23D is a flowchart illustrating an example method 2304C for interacting with mixed reality content on a mobile device in accordance with some implementations.

Figure 24:
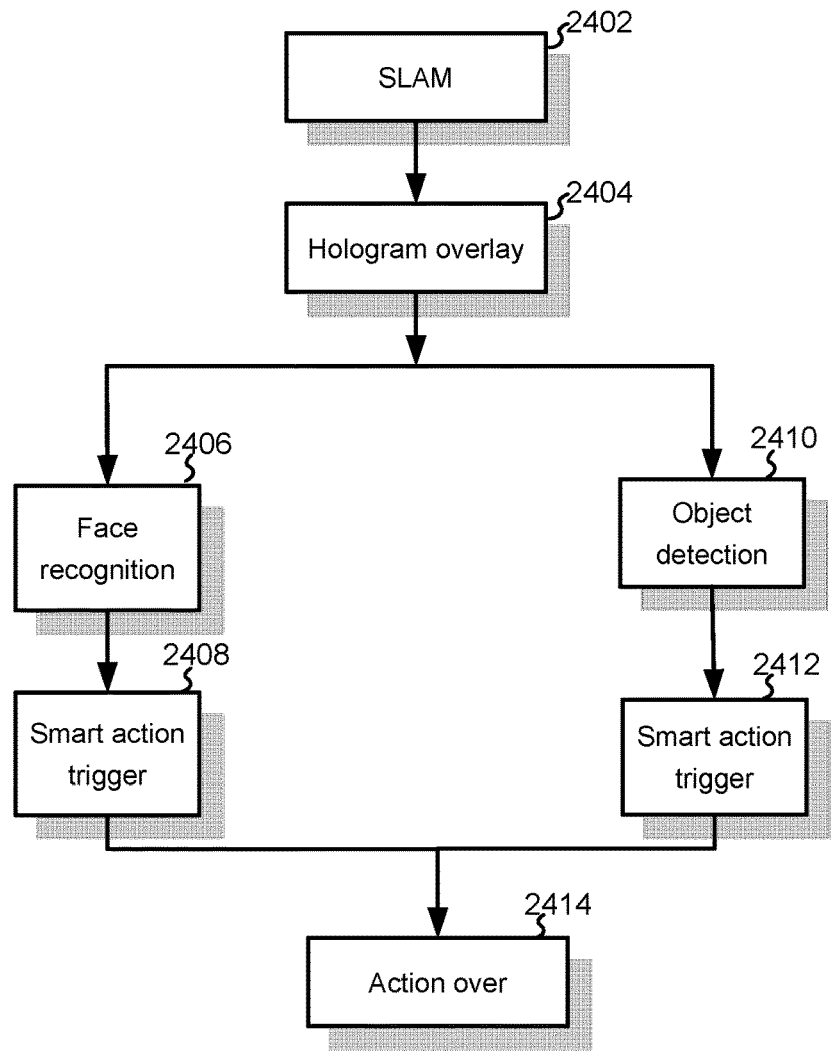

FIG. 24 is a flowchart illustrating an example method 2400 for interacting with mixed reality content on a mobile device in accordance with some implementations.

In method 2400, a smart phone's camera may detect a human face and another object. Based on the object detected, the method can estimate the surrounding environment, for example, whether a user is at a restaurant (if a restraint chair is detected) or a classroom (if a study desk and a blackboard are detected).

After the surrounding environment is understood, holograms relevant to the surrounding environment may be generated. For example, after detecting that there is a cup containing milk, a hologram character jumping into the milk may be generated. For another example, after detecting that a user is stretching out her left hand, a hologram of a monkey can be generated as appearing to climb onto the hand.

Graphically Removing Headset Displayed in Holograms

Technological advances in the development of Head-Mounted Display (HMD) technology have enabled wider field of view (FOV), higher resolution, and lower latency in holographic communications. Either a virtual reality HMD or an augmented reality HMD, however, would obstruct at least a portion of a user's head or face, making it difficult and less efficient to reconstruct the user's head or face in its entirety in a holographic communication.

The technologies described in this disclosure may graphically modify holograms to remove HMD a user wears from the holograms, thereby making the user's face visible in the holograms.

Two features may be implemented to this end. The first feature models a user's face in 3D and generates texture maps for each eye direction in advance. The second feature, after detecting the user's eye direction, the user's face, and the position of the HMD, replaces the portion of the user's head or face obstructed by the HMD with a transparent HMD and shows the user's face or head in accordance with the user's eye direction.

Figure 25:
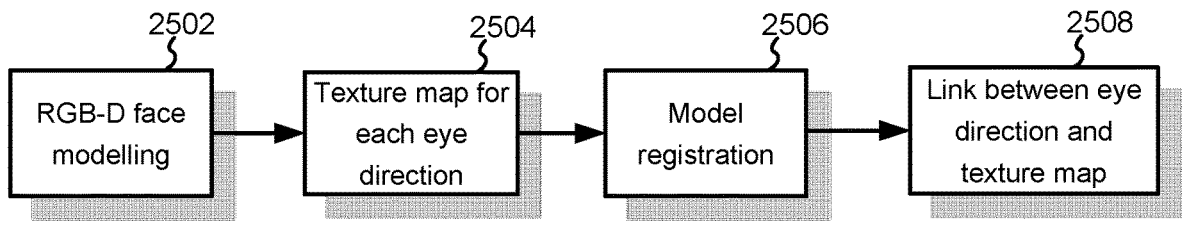
FIGS. 25-26 are flowcharts illustrating example methods for graphically removing a headset displayed in a hologram and making a user's face visible.

FIG. 25 is a flowchart illustrating an example method 2500 for removing a headset displayed in a hologram and making a user's face visible. The method 2500 when executed can provide functionality described with reference to the first feature.

At step 2502, a RGB-D sensor is used to create a 3D model of a user wearing a HMD. As part of the 2502, the user may display one or more different facial expressions, when facing the RGB-D sensor; a 3D model may be building based on the user's facial data collected in 2502.

At 2504, a texture map is extracted for each eye direction of the user. As part of this step, the user looks at a screen, and the screen may display a small dot one at a time, e.g., from top to bottom and from left to right. The user keeps her head still, while trying to track the different locations of the small dot.

Whenever the dot shows on the screen, the user may turn her eyes to the small dot, and RGB-D camera will take an RGB image and depth image of the user's eyes. In some implementations, the dot may be shown at around 100 different screen locations so as to cover a sufficient number of directions to which the user can turn her eyes.

At step 2506, based on the depth images and the landmark detected on the user's face shown in the RGB images, 2D images can be registered to a 3D model using an ICP algorithm. A texture map for each eye direction of the user may then be generated.

At step 2508, the 3D model may provide one or more links between a user's eye direction and a corresponding texture map.

Figure 26:
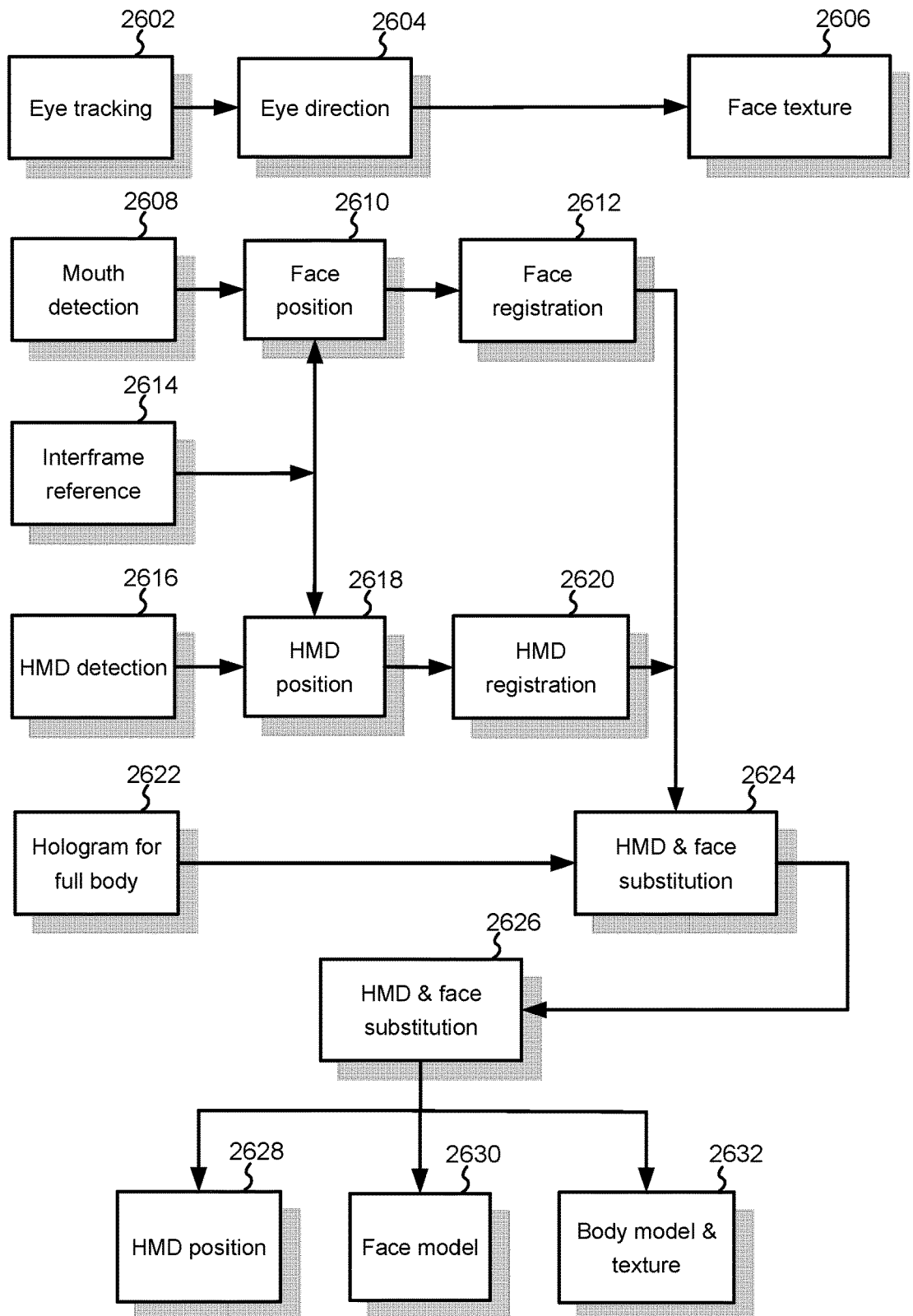

FIG. 26 is a flowchart illustrating an example method 2600 for removing a headset displayed in a hologram and making a user's face visible. The method 2600 when executed can provide functionality described with reference to the second feature.

An HMD may track a user's eye directions (2602); the user's eye directions (2604) may then be provided to a 3D model. The user's eye direction in each frame may be detected and tracked between consecutive frames, to produce a deformation field between the two frames.

The position of the user's mouth and the position of the HMD may also be detected (2608 and 2616, respectively). This may be done by training a mouth detector and an HMD detector using machine learning algorithms or deep learning algorithms.

Using ICP algorithm, a separate offline modelled human face and HMD (e.g., produced by executing the method 2500) may be registered to the full body model. Then, according to the expression of the user's face, the offline modelled human face solves the expression change the expression accordingly.

After that, the user's face and the HMD may be graphically removed from the full body model and the offline modelled face and HMD model may be placed at the same location. In some implementations, the online modelled face may have the texture around eye areas and the offline modelled HMD model may be transparent.

Note that the texture color may be different between the offline system and the online system. A passion integration may be conducted to correct the color of the texture but preserve the details. Finally, the system can output the information of a full body model (not including face and HMD) with its texture, and face's model and texture and the HMD's position.

One example ICP algorithm may be as follows. The following energy function may be constructed:

$$E = \omega_g E_g + \omega_c E_c + \omega_t E_t$$

$E_g$ is point cloud registration term:

$$E_g = \sum_{k=1}^{m} P(M(B \times w_{exp,i})^{v_k}, v_k^*)$$

M is the transformation matrix of current frame, B is the user-specific blend shapes, $W_{exp,i}$ is the vectors of expression weights of frame i, $v_k$ is the index of blend shapes lower part face vertices and $v_k$ is the corresponding closest point in the target point cloud, and P(,) measures their point plane distance.

$E_c$ is the texture registration term:

$$E_c = \sum_{j \in \mathcal{P}} \sum_{v_k \in V_j} \|G_j(M(B \times w_{exp,i})^{v_k}) - T(v_k)\|_2^2$$

F is the set of all cameras where the lower part of face is visible, $V_j$ is the set of all visible vertices in camera j, Gj is the image gradient of the projection of vertex vk in camera j. T(vk) is the image gradient of vertex vk in texture image.

$E_t$ is temporal smoothness term:

$$E_t + \|w_{exp,i} - w_{exp,i-1}\|_2^2$$

Figure 27:
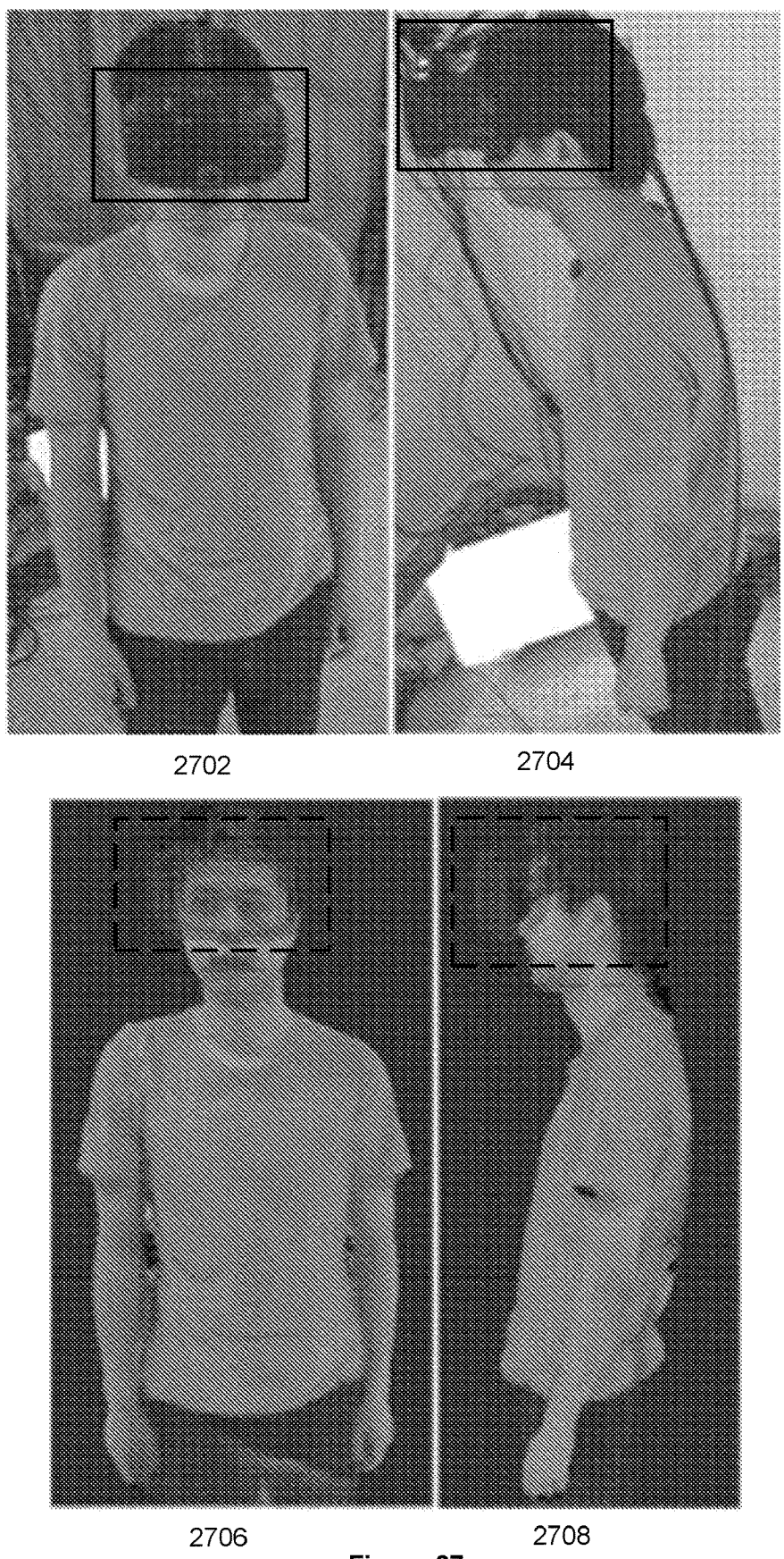
FIG. 27 shows four images including two images showing a user wearing a headset device and graphically modified images showing the user without the headset.

FIG. 27 shows four images including two images 2702 and 2704 showing a user wearing a headset device (e.g., an HMD) and two graphically modified images 2706 and 2708 showing the user without the headset device.

As shown in the images 2702 and 2704, at least a portion of a user's face or head is blocked by an HMD that the user is wearing.

In contrast, after technologies described in reference to the methods 2500 and 2600 are applied to the images 2702 and 2704, the HMD is graphically removed and replaced with a transparent portion, making the user's facial portioned blocked by the HMD visible.

Although FIGS. 3, 4, and 8 show a "user device 300," a "remote server 400," "a computing device 800," respectively, FIGS. 3, 4, and 8 are intended more as functional description of the various features which may be present in computer systems than as a structural schematic of the implementations described herein. In practice, and as recognized by those of ordinary skill in the art, items shown separately could be combined and some items could be separated.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components.

These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first camera could be termed a second camera, and, similarly, a second camera could be termed a first camera, without changing the meaning of the description, so long as all occurrences of the "first camera" are renamed consistently and all occurrences of the "second camera" are renamed consistently. The first camera and the second camera are both cameras, but they are not the same camera.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. An interactive three-dimensional (3D) textured mesh hologram rendering mobile device comprising:
    a mesh loader configured to download compressed mesh sequences from a remote server into a local storage buffer;
    a mesh decoder that is configured to decode compressed mesh sequences into frames of meshes in real-time;
    a mesh decoder manager that is configured to request compressed mesh sequences from the mesh loader and to request the mesh decoder to decode the compressed mesh sequences;
    a player manager that is configured to decode texture video and to request corresponding decoded mesh from the mesh decoder manager and to maintain synchronizations between requesting the corresponding decoded mesh and decoding the texture video;
    a renderer that is configured to render, using a rendering engine, the decoded mesh on a canvas; and
    a camera controller that is configured to detect one or more user actions and control a hardware camera in accordance with the one or more user actions.

2. The interactive 3D textured mesh hologram rendering mobile device of claim 1, wherein the rendering engine comprises a Web Graphics Library (WebGL) rendering engine.

3. The interactive 3D textured mesh hologram rendering mobile device of claim 1, wherein the canvas comprises a HTML5 canvas.

4. The interactive 3D textured mesh hologram rendering mobile device of claim 1, wherein the mesh decoder is transcoded from a programming language not supported by the mobile device.

5. The interactive 3D textured mesh hologram rendering mobile device of claim 1, wherein the mesh loader and the mesh decoder manager are executed synchronously.

6. The interactive 3D textured mesh hologram rendering mobile device of claim 1, wherein the camera controller uses the hardware camera to capture the one or more user actions and provides the one or more user actions as feedback to the renderer.

7. The interactive 3D textured mesh hologram rendering mobile device of claim 1, wherein the mesh decoder manager is configured to request the mesh decoder to decode the compressed mesh sequences on an as-needed basis.

8. The interactive 3D textured mesh hologram rendering mobile device of claim 7, wherein the mesh decoder manager is configured to request the mesh decoder to decode a predefined amount of compressed mesh sequences more than those requested by the player manager.

9. The interactive 3D textured mesh hologram rendering mobile device of claim 1, wherein the mesh decoder manager is configured to remove previously-decoded mesh from a mesh buffer connected to the player manager.

10. The interactive 3D textured mesh hologram rendering mobile device of claim 1, wherein the mesh loader is configured to download compressed mesh sequences from the remote server, even absent a request by the mesh decoder manager to download the compressed mesh sequences.

11. A method for rendering interactive three-dimensional (3D) textured mesh hologram, comprising:
    downloading, by a mesh loader, compressed mesh sequences from a remote server into a local storage buffer;
    decoding, by a mesh decoder, compressed mesh sequences into decoded mesh comprising frames of meshes in real-time;

requesting, by a mesh decoder manager, compressed mesh sequences from the mesh loader and to request the mesh decoder to decode the compressed mesh sequences;

decoding, by a player manager, texture video and to request corresponding decoded mesh from the mesh decoder manager and to maintain synchronizations between requesting the corresponding decoded mesh and decoding the texture video;

rendering, by a renderer using a rendering engine, the decoded mesh on a canvas; and detecting, by a camera controller, one or more user actions and controlling a hardware camera in accordance with the one or more user actions.

12. The method of claim 11, wherein the rendering engine comprises a Web Graphics Library (WebGL) rendering engine.

13. The method of claim 11, wherein the canvas comprises a HTML5 canvas.

14. The method of claim 11, further comprising: transcoding the mesh decoder from a programming language not supported by the mobile device.

15. The method of claim 11, wherein the mesh loader and the mesh decoder manager are executed synchronously.

16. The method of claim 11, further comprising:
using the hardware camera to capture the one or more user actions and providing the one or more user actions as feedback to the renderer.

17. The method of claim 11, further comprising:
requesting the mesh decoder to decode the compressed mesh sequences on an as-needed basis.

18. The method of claim 11, further comprising:
requesting the mesh decoder to decode a predefined amount of compressed mesh sequences more than those requested by the player manager.

19. The method of claim 11, further comprising:
removing previously-decoded mesh from a mesh buffer connected to the player manager.

20. The method of claim 11, further comprising:
downloading compressed mesh sequences from the remote server, even absent a request by the mesh decoder manager to download the compressed mesh sequences.

* * * * *